(12) United States Patent
Plato et al.

(10) Patent No.: US 12,029,147 B2
(45) Date of Patent: Jul. 9, 2024

(54) CROP DISEASE PREDICTION AND ASSOCIATED METHODS AND SYSTEMS

(71) Applicant: Evergreen FS, Inc., Bloomington, IL (US)

(72) Inventors: Scott Plato, Bloomington, IL (US); Matthew Free, Bloomington, IL (US)

(73) Assignee: Evergreen FS, Inc., Bloomington, IL (US)

( * ) Notice: Subject to any disclaimer, the term of this patent is extended or adjusted under 35 U.S.C. 154(b) by 0 days.

(21) Appl. No.: 18/136,968

(22) Filed: Apr. 20, 2023

(65) Prior Publication Data

US 2023/0413714 A1 Dec. 28, 2023

Related U.S. Application Data

(60) Provisional application No. 63/355,095, filed on Jun. 23, 2022.

(51) Int. Cl.
*A01B 79/00* (2006.01)
*G01W 1/02* (2006.01)
*G06N 3/0442* (2023.01)

(52) U.S. Cl.
CPC ............. *A01B 79/005* (2013.01); *G01W 1/02* (2013.01); *G06N 3/0442* (2023.01)

(58) Field of Classification Search
CPC ....... A01B 79/005; A01B 79/00; A01B 79/02; G06N 3/0442; G06N 20/00; G06N 3/08;
(Continued)

(56) References Cited

U.S. PATENT DOCUMENTS 9,489,576 B2 11/2016 Johnson et al.
10,755,129 B2 8/2020 Chen et al.
(Continued)

FOREIGN PATENT DOCUMENTS

CA 3022253 A1 * 4/2019 ............ A01G 29/00
CN 113505919 A 10/2021
(Continued)

OTHER PUBLICATIONS

Daniel Godoy, "Understanding binary cross-entropy / log loss: a visual explanation", Understanding binary cross-entropy, Nov. 21, 2018, pp. 1-14.
(Continued)

*Primary Examiner* — Jeffrey P Aiello
(74) *Attorney, Agent, or Firm* — American Patent Agency PC; Daniar Hussain; Stephen M. Hou

(57) ABSTRACT

Systems and methods for predicting crop diseases in a crop field using machine learning are disclosed. The method includes receiving one or more ambient weather parameters related to environmental conditions around the crop field from an environmental sensor; determining a disease risk indicator associated with the disease and the crop field based on the one or more ambient weather parameters, using a disease risk machine learning module trained on historical weather data from a weather database; receiving a pathogen incidence indicator related to the presence of a pathogen around the crop field from a pathogen sensor, wherein the pathogen is associated with the disease; and generating a disease score based on the disease risk indicator and the pathogen incidence indicator, where the disease score represents the severity of the disease around the crop field.

5 Claims, 17 Drawing Sheets

(58) Field of Classification Search
CPC ............ G06N 3/045; G06N 7/01; G06N 3/02;
G06N 3/0464; G06N 3/088; G01W 1/02;
G01W 2203/00; G01W 1/06; G01W 1/14;
G06Q 50/02; G06Q 10/04; G06Q
10/0833; G06T 2207/20081; G06T
2207/20084; G06T 7/0012; G06T
2207/30188; G06T 7/11; A01G 7/00;
A01G 7/06; A01G 22/00
USPC .................. 702/2–3, 19, 81, 189; 703/2, 11;
800/279, 298, 301
See application file for complete search history.

(56) References Cited

U.S. PATENT DOCUMENTS

| | | | | |
|---|---|---|---|---|
| 11,483,981 | B1* | 11/2022 | Lo | ............ A01G 31/06 |
| 2014/0259920 | A1* | 9/2014 | Wilson | ............ A01G 7/045 |
| | | | | 47/62 R |
| 2018/0279563 | A1* | 10/2018 | Wolfe | ............ A01G 25/02 |
| 2019/0156437 | A1 | 5/2019 | Dail et al. | |
| 2019/0179982 | A1* | 6/2019 | Reese | ............ G06F 30/20 |
| 2020/0355597 | A1 | 11/2020 | Allan et al. | |
| 2021/0282404 | A1* | 9/2021 | Dubournet | ............ G06Q 50/02 |
| 2021/0350295 | A1* | 11/2021 | Singh | ............ G06Q 30/0205 |

FOREIGN PATENT DOCUMENTS

| | | | | |
|---|---|---|---|---|
| CN | 114399193 A | * | 4/2022 | |
| IN | 201811012072 A | | 10/2019 | |
| WO | WO-2020016193 A1 | * | 1/2020 | ............ A01N 25/00 |
| WO | WO-2022099169 A1 | * | 5/2022 | |

OTHER PUBLICATIONS

Pierce Anderson Paul, "Epidemiology and predictive management of gray leaf spot of maize", Plant Pathology and Microbiology, Jan. 1, 2003, pp. 1-157.

Vincelli et al., "Assessing Foliar Diseases of Corn, Soybeans, and Wheat", Extension Plant Pathologists, Nov. 2011, pp. 1-5.

* cited by examiner

|  | Seasons in Validation Data Set | |
|---|---|---|
|  | All | All except Y years |
| Fields in Training Data — All |  | Leave-one-year-out cross validation for each year in Y — 902 |
| Fields in Training Data — All except X years | Leave-one-field-out cross validation for each field-year in X — 904 | Leave-one-field-year-out cross validation for each field-year in combo — 906 |

*FIG. 9*

| | Field Name | Stand Count | Analytics | Analytics #2 | Scout 1 | Scout 2 |
|---|---|---|---|---|---|---|
| ○ | 116 | | | 7/9/2022 ⇕ | ○ 5/26/2022 | ○ 7/13/2022 |
| ○ | Bob's E. 80 | | | ⇕ | ○ 6/9/2022 | ○ 7/5/2022 |
| ● | Bob's Home | | | ⇕ | ● 5/26/2022 | ● 6/23/2022 |
| ● | Bonnie Pritchard East | | | ⇕ | ● 6/7/2022 | ● 7/1/2022 |
| ● | Bonnie Pritchard West | | | ⇕ | ● 6/7/2022 | ● 7/1/2022 |
| ● | Bud's North | | | ⇕ | ● 6/7/2022 | ● 7/5/2022 |
| ● | Bud's South | | | ⇕ | ● 5/26/2022 | ● 7/5/2022 |
| ● | Don Home | | | ⇕ | ● 6/1/2022 | ● 6/23/2022 |
| ● | Driscoll Bin Site | | | ⇕ | ● 5/28/2022 | ● 6/23/2022 |
| ● | Driscoll North 72 | | | ⇕ | ● 6/2/2022 | ● 7/11/2022 |

1502 Search by Field Name | Field Details
1504 (header row)
1506 (first data row)

*FIG. 15*

CROP DISEASE PREDICTION AND ASSOCIATED METHODS AND SYSTEMS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and all parent, grandparent, great-grandparent, etc. applications of such applications, are also incorporated by reference, including any priority claims made in those applications and any material incorporated by reference, to the extent such subject matter is not inconsistent herewith.

Notice of Copyrights and Trade Dress

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the U.S. Patent and Trademark Office files or records, but otherwise reserves all copyright and trade dress rights whatsoever.

FIELD OF THE INVENTION

Embodiments of the invention are in the field of crop disease prediction and pertain particularly to systems and methods for real-time disease triangle monitoring and the generation of disease scores using machine learning modules.

BACKGROUND OF THE INVENTION

The statements in the background of the invention are provided to assist with understanding the invention and its applications and uses, and may not constitute prior art.

Plant threats may reduce yields or even wipe out a crop season, potentially threatening global food security. Early detection and identification of major plant threats, such as crop diseases, insects, and pests, to minimize or prevent crop loss, have always been vital aspects of agriculture. In recent years, the introduction of modern technologies has improved society's ability to meet global food demands by timely harvesting high quality yields and fulfilling logistic demands.

Common crops are prone to various diseases and threats, which hamper the growth and quality of the yields. For example, tar spot, leaf spot (e.g., gray leaf spot), corn blight, Southern corn rust, Northern corn leaf blight, white mold, and soybean rust are some of the major crop-related concerns that farmers across the United States face. Tar spot is particularly notorious: Between 20-80 bushels per acre of corn are lost to tar spot annually throughout the United States, resulting in hundreds of millions of dollars in economic losses. The disease is caused by the plant pathogen *Phyllachora maydis* and is characterized by the formation of dark or black spots on the surface of the corn leaves. Tar spot develops when the temperature and humidity of a crop field are conducive to infection. Although it is very difficult to prevent the formation of tar spot, the disease may be controlled using an appropriately applied fungicide. Preliminary identification of tar spot is generally made visually, followed by a laboratory diagnosis that affirmatively distinguishes it from other potential pathogens. Control of such foliar disease may be made more effective by identifying which fields in each geographic region are susceptible to disease outbreaks. Currently, the typical way to detect foliar disease is through reactive technology and practices such as normalized difference vegetation index (NDVI) analysis and physical scouting. However, these processes are both time-consuming and unreliable.

Although current solutions have been partially successful in solving the above-mentioned concerns, they have several drawbacks as well. For example, there is no proactive diagnosis technique or method of estimation that analyzes precursors of threats, such as ambient airborne viruses or pathogens that could be harmful to plant growth. The farmer must exercise discretion to decide whether and when to apply fungicides, decisions that entail analyzing various complex factors. Inadequate or mistimed fungicide applications may result in yield loss and even, depending on severity, a total loss of the season's crop. Conversely, applying a fungicide preemptively or mistakenly, in the absence of an environmental condition or pathogen, may be unnecessarily costly. Making such erroneous or suboptimal decisions reduces the agricultural industry's profits and may lead to inefficient production and management of food resources.

Furthermore, existing solutions include the use of cams that are designed to detect and measure pathogens in an enclosed area. For example, pathogens such as infectious spores are typically measured in a greenhouse where the user may calculate or control volume. Such solutions are unsuitable for outdoor crops, such as corn. In the absence of sufficient data to determine what constitutes a high level of pathogens such as spores, merely detecting the presence of the spore may not be useful.

Therefore, there is a recognized need for such techniques that overcome these challenges and take proper preventive measures. It is against this background that various embodiments of the present invention were developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Embodiments of the present invention provide a computer-implemented method for predicting a disease related to a crop field of a crop. The method includes receiving one or more ambient weather parameters related to environmental conditions around the crop field from an environmental sensor; determining a disease risk indicator associated with the disease and the crop field based on the one or more ambient weather parameters, using a disease risk machine learning module trained on historical weather data from a weather database; receiving a pathogen incidence indicator related to a presence of a pathogen around the crop field from a pathogen sensor, where the pathogen is associated with the disease; and generating a disease score based on the disease risk indicator and the pathogen incidence indicator, where the disease score represents a severity of the disease around the crop field.

In one embodiment, the disease risk indicator is specific to the disease. In another embodiment, the disease risk indicator is generic.

In one embodiment, the disease risk indicator is determined using a real-time rolling window. In another embodiment, the disease risk indicator is determined by at least filtering a maximum disease risk for an area of interest.

In one embodiment, the disease score at a given crop field location is proportional to the disease risk indicator at the given crop field location, when a pathogen is detected within a predefined distance threshold of the given crop field location.

In one embodiment, the program code further comprises steps to transmit an alert to an electronic device, when a disease risk indicator threshold is exceeded around the crop field. In another embodiment, the program code further comprises steps to transmit an alert to an electronic device, when a disease score threshold is exceeded around the crop field.

In one embodiment, the program code further comprises steps to validate the one or more ambient weather parameters related to ambient environmental conditions using stratified random sampling.

In one embodiment, the disease risk machine learning module is selected from the group consisting of a convolutional neural network (CNN), a random forest, and a recurrent neural network (RNN). In another embodiment, the disease risk machine learning module is a bidirectional long short-term memory (LSTM) neural network.

In some embodiments, the historical weather data from the weather database comprises at least one sample historical weather data set originating from at least one weather service, and wherein the disease risk machine learning module is trained on ground truth data comprising one or more sample known disease risk indicator sets for one or more sample diseases. In one embodiment, at least one sample known disease risk indicator set originates from ground-truth measures of the disease through monitors of canopy conditions. In another embodiment, at least one sample known disease risk indicator set originates from ground-truth measures of the disease through physical scouting and rating.

In various embodiments, the pathogen sensor is a spore collection device.

In one embodiment, the historical weather data is based on a pre-defined time window determined based on a combination of the crop and the pathogen.

In one embodiment, at least one ambient weather parameter is selected from the group consisting of temperature, heat index, atmospheric pressure, humidity, wind speed, and cloudiness around the crop field.

In one embodiment, the disease risk indicator is determined in real-time. In another embodiment, the disease score is generated in real-time.

In some embodiments, a computer program product is disclosed. The computer program may be used for predicting a disease related to a crop field of a crop, and may include a computer-readable storage medium having program instructions, or program code, embodied therewith, the program instructions executable by a processor to cause the processor to perform the aforementioned steps.

In various embodiments, a system is described, including a memory that stores computer-executable components, and a hardware processor, operably coupled to the memory, and that executes the computer-executable components stored in the memory, wherein the computer-executable components may include components communicatively coupled with the processor that execute the aforementioned steps.

In another embodiment, the present invention is a non-transitory, computer-readable storage medium storing executable instructions, which when executed by a processor, causes the processor to perform a process for predicting a disease related to a crop field of a crop, the instructions causing the processor to perform the aforementioned steps.

In another embodiment, the present invention is a system for predicting a disease related to a crop field of a crop, the system comprising a user device, a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the aforementioned steps.

In yet another embodiment, the present invention is a computerized server comprising at least one processor, memory, and a plurality of computer codes embodied on said memory, said plurality of computer codes which when executed causes said processor to execute a process comprising the aforementioned steps.

Other aspects and embodiments of the present invention include the methods, processes, and algorithms comprising the steps described herein, and include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

FIG. 9 illustrates diverse stratified random sampling employed to assess accuracy of the measures of canopy environment, in accordance with an exemplary embodiment of the present invention.

FIG. 15 illustrates additional details of a field report, in accordance with an exemplary embodiment of the present invention.

DETAILED DESCRIPTION OF THE INVENTION

Figure 1:
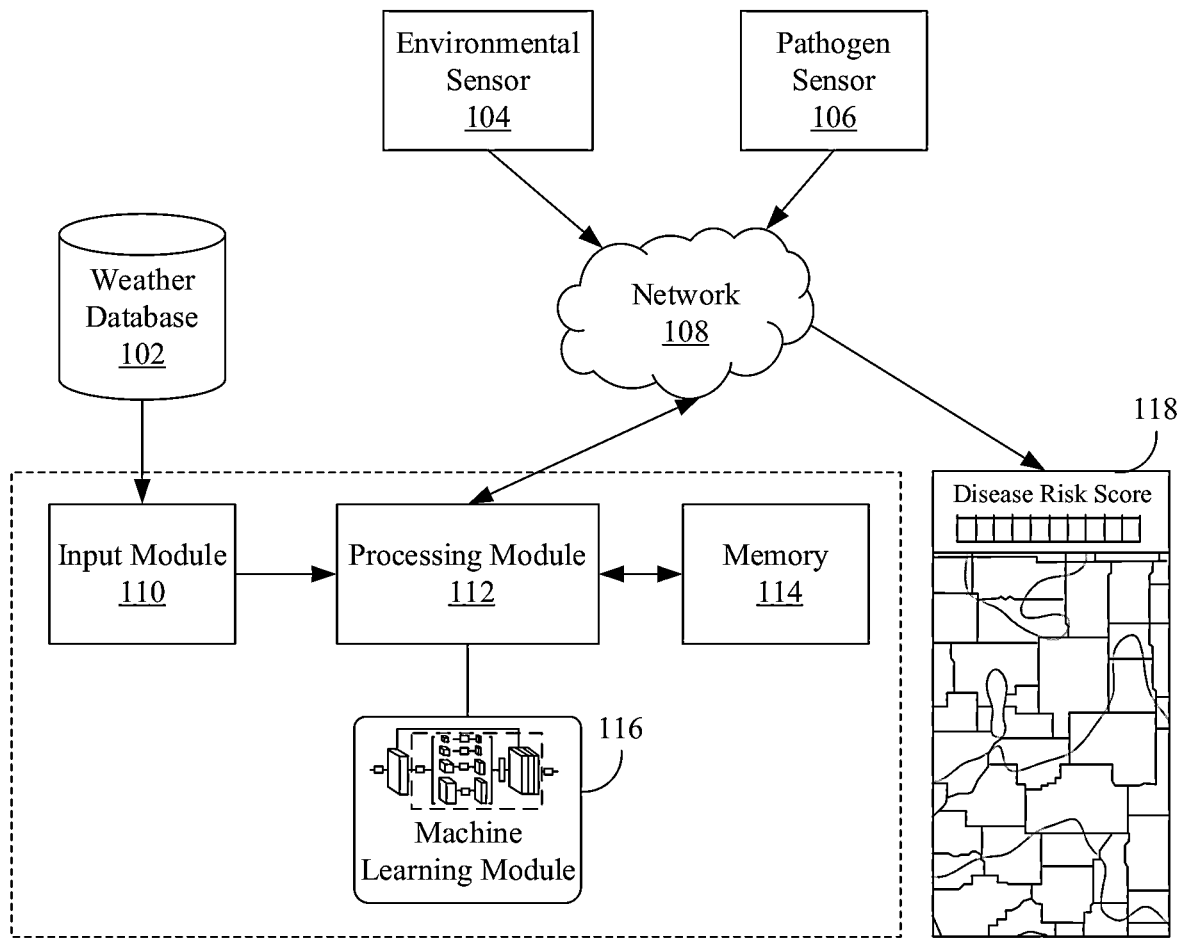
FIG. 1 is a block diagram of a system for predicting crop disease, in accordance with exemplary embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing upon, the invention.

Definitions and Examples

Following are definitions for key terms related to crop disease prediction that are used herein.

"Ambient weather parameters" refer to any parameter measured using an environmental sensor on a particular crop field or geographical area. Ambient weather parameters usually describe environmental and weather conditions around a particular crop field. Examples of key ambient weather parameters include rain precipitation, or rainfall, typically in inches or millimeters. Precipitation measures such as Accumulated Rain ("Acc Rain") may be accurately derived from Doppler radar data. Key ambient weather parameters also include heat index, atmospheric pressure, wind speed, cloudiness around the crop field, humidity ($g/m^3$), relative humidity (%), dew point, and any temperature measurement such as air temperature, surface soil temperature, and 4-inch depth soil temperature (4-inch soil temp).

Examples of environmental sensors included the ATMOS 41 all-in-one weather station, the Decagon VP-4 sensor, and the Phytos 31 leaf wetness sensor. In some embodiments, ambient weather parameters are measured using live weather sensors located within a specific crop field.

"Historical weather data" refers to any measured weather parameter obtained from a weather database. For example, the historical weather data may include hourly weather data from a weather service provider. Historical weather data may include series of measured temperature, humidity, and rainfall, as well as derived statistical data over periods of time, such as maxima, minima, averages, etc. Parameters directly derived from weather indicators may also be regarded herein as historical weather data. For example, Growing Degree Unit (GDU) or Growing Degree Days (GDD), a parameter indicating crop maturity rates based on weather input such as daily temperature maxima and/or minima, may be regarded as historical weather data.

Although the term "weather" may encompass medium- to long-term environmental trends in a region, the term may also broadly include longer term conditions referred to as "climate," as well as short-term or transient conditions such as those commonly referred to as "environmental conditions," "ambient conditions," "microclimate," "weather environment," or "environment." The terms "ambient weather parameters," "ambient parameters," "ambient environment," "ambient conditions," "canopy conditions," "ambient canopy conditions," and "canopy-level conditions" are used interchangeably herein.

In one embodiment, weather databases may include commercial weather data located on private storage devices. In another embodiment, weather databases may include commercial weather data located on the Internet (i.e., in the cloud) and available through paid services. In yet another embodiment, weather databases may include publicly available weather data offered through public databases connected to the Internet. In various embodiments, weather databases may include a combination of commercial and public weather data. Weather databases may be offered by weather data service providers such as AgroMonitor (agromonitoring.com) and IBM Weather (www.ibm.com/products weather-company-data-packages), or by weather stations. Weather data service providers are also called "weather sources" herein.

A distinction is made herein between a pathogen and its associated disease. A pathogen is a disease agent, and refers to an organism (e.g., virus, plant, fungus) or organism product that may indicate or cause a crop disease. For example, white mold is a disease that may affect hundreds of plant species, caused by the fungus *Sclerotinia sclerotiorum*. As discussed above, tar spot is an ascomycete disease affecting maize/corn. Tar spot is caused by the plant pathogen *Phyllachora maydis*. Fungal infection accompanying *Phyllachora maydis* may cause significant foliar damage and lead to important yield reductions. Apart from tar spot and white mold, diseases of interest include leaf spot, corn blight, Southern corn rust, Northern corn leaf blight, soybean rust, cotton blight, and black mold. Spores forming part of the life cycles of many parasitic plants, algae, and fungi, are a primary example of pathogens.

Legacy pathogen detection relies on scouting, where pathogens are collected, analyzed, identified, and reported. However, more modern methods of pathogen detection use pathogen sensors. For example, spores are heavily monitored in agriculture, increasingly using specialized pathogen sensors such as spore collection devices (e.g., SporeCam devices). Spore collection devices may be used to monitor pathogens related to tar spot, cotton blight, and black mold.

Pathogen sensors, such as spore collection devices, generate a measure of the incidence of the pathogen called a "pathogen incidence indicator" for any specific unit area of a monitored crop field. A pathogen incidence indicator indicates the presence of the pathogen in the crop field and may specify the level of pathogen detected by the pathogen sensor. In some embodiments, the pathogen incidence indicator is represented by a real number within the unit interval [0, 1], where "0" represents the absence of detected pathogen incidence, and "1" represents the highest possible level of detected pathogen incidence. In other embodiments, a pathogen incidence indicator is a cruder indicator using a Boolean value, with "0" and "1" representing the absence and presence of detected pathogen incidence, respectively.

A "disease risk indicator" is an indicator of the likelihood of a particular disease or a class of diseases that grow within similar conditions. The terms "disease risk indicator," "disease pressure," and "disease-supportive indicator" are used interchangeably herein. In some embodiments, the disease risk indicator is represented by a real number within the unit interval [0, 1], where "0" represents the absence of disease risk, and "1" represents the highest level of disease risk. In other embodiments, the disease risk indicator is a Boolean value, with "0" and "1" representing the absence and presence of disease risk, respectively. In various embodiments described herein, disease risk indicators are generated using machine learning modules trained using historical weather data and ambient weather parameters. In various embodiments, the disease risk indicator is time-dependent and may change its state or value at regular intervals of time, such as every minute, every hour, every day, or every week. Furthermore, the disease risk indicator may be updated based on real-time input from environmental sensors. Hence, the disease risk indicator may be regarded as a real-time disease risk indicator.

A disease risk indicator may be either generic or disease-specific. The conditions surrounding the growth of some diseases may be so distinct from one another that they require the development of disease-specific risk indicators. Soybean rust and tar spot fall into this category. Nevertheless, multiple diseases may grow and proliferate within similar conditions. For such disease classes, a generic disease risk indicator may be developed. Generic disease risk indicators are very valuable as they allow to accurately predict multiple diseases, thus saving resources. Although the disease risk indicators discussed herein are typically generic (e.g., see FIG. 3), it is possible to train the machine learning modules to generate disease-specific risk indicators.

Figure 4:
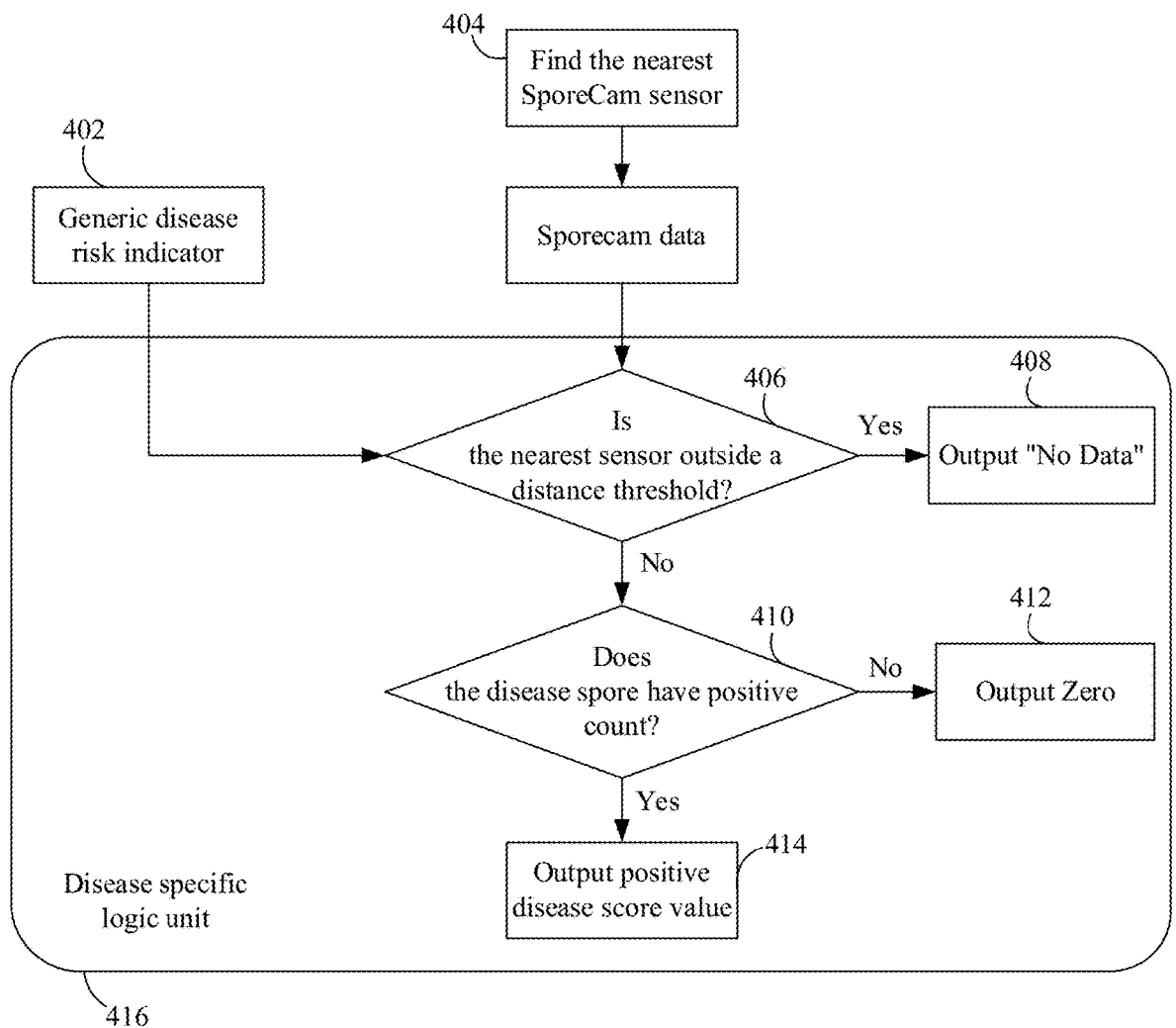
FIG. 4 illustrates a process for applying a machine learning module to generate predictions of crop disease, in accordance with an exemplary embodiment of the present invention.

A "disease score" is based on one or more disease risk indicators and one or more pathogen incidence indicators, and represents the potential severity of a given disease, based on a disease risk and pathogen incidence levels (e.g., see FIG. 4). A disease score may be generated for any specific unit area of a monitored crop field. In some embodiments, the disease score is selected from a set of qualitative or ordered categories. For example, the disease score may comprise the three categories of "low," "medium," or "high," where a "high" disease score is considered a higher risk than a "medium" disease score, which in turn is considered a higher risk than a "low" disease score. In some embodiments, the disease score is quantitative. In various embodiments, the disease score may be a natural number scaled from 1 to 10, a real number within the unit interval [0, 1], or a Boolean value selected from "0" and "1." Typically, consecutive high levels in the disease risk and pathogen incidence indicators lead to a high disease score, whereas consecutive low levels in the disease risk and pathogen incidence indicators lead to a low disease score. The generation of disease scores is further discussed in the context of FIG. 4.

Similar to disease risk indicators, disease scores may be updated based on real-time input from pathogen sensors and real-time disease risk indicator generation. Hence, the disease score may be regarded as a real-time disease score.

Disease risk indicators, disease scores, and pathogen incidence indicators that are relative to a given geographical area may be overlaid on a map of the geographical area, to generate disease risk maps, disease score heatmaps, and pathogen incidence heatmaps, respectively.

Crop Disease Prediction System

FIG. 1 is a block diagram of a system for predicting crop disease, in accordance with exemplary embodiments of the present invention. The system may be configured to monitor the disease triangle (i.e., host plant, weather, and pathogen) for a crop field of a crop (e.g., corn, wheat, soybeans, or any general row crop) in real-time, in order to generate a field-level disease score (118) associated with the crop field and a particular disease.

The system includes an environmental sensor (104), which may be configured to measure one or more ambient weather parameters related to the environmental conditions around the crop field. In some embodiments, a pathogen sensor (106) is configured to measure an incidence of a pathogen in a crop field and generate a pathogen incidence indicator, where the pathogen is associated with the target disease. In some embodiments, the pathogen sensor (106) is a spore collection device (e.g., a SporeCam). An input module (110) is configured to receive historical weather data from a weather database (102). The weather database (102) may provide publicly available information or data from a commercial source.

A processing module (112) may be configured to execute instructions stored in a memory (114) that is coupled to the processing module (112). The execution of the instructions enables the processing module (112) to receive at least one ambient weather parameter related to the environmental conditions of the crop field, originating from the environmental sensor (104), as well as historical weather data from the weather database (102). In some embodiments, the processing module (112) is configured to receive, in addition to ambient weather parameters and historical weather data, an indicator of the incidence of a pathogen on the crop field (i.e., a pathogen incidence indicator), from the pathogen sensor (106).

In the embodiment of FIG. 1, the environmental sensor (104) and pathogen sensor (106) are connected to the processing module (112) via a wireless or wired network (108), whereas the weather database (102) is locally connected to the input module (110). In some embodiments, the weather database (102) is remote (e.g., cloud-based). In some embodiments, the network (108) may be a private network or a public broadband network such as the Internet. In one exemplary embodiment, the network (108) is a wireless network using short wave, microwave, high frequency, wireless fidelity (Wi-Fi), Bluetooth, global system for mobile communications (GSM), code division multiple access (CDMA), second-generation (2G), third-generation (3G), fourth-generation (4G), 4G long term evolution (LTE), 4G LTE-A, fifth-generation (5G), or any other wireless communication technology to establish a wireless communication for exchanging data.

The processing module (112) is configured to generate one or more indicators associated with disease likelihood around the crop field. The processing module (112) is further configured to send the generated indicators of disease likelihood to an electronic device (118) configured to display them. In various embodiments, the processing module (112) also transmits data received from the environmental sensors (104), the pathogen sensors (106), and the weather database (102), that are relevant to a particular crop field or geographical area, to the electronic device (118) for display.

The disease risk indicator is a major indicator of crop field health and is based on whether environmental conditions are present for inoculation of one or more crop diseases. The processing module (112) determines a disease risk indicator based on the received one or more ambient weather parameters and the historical weather data, using a machine learning module (116). As discussed in the definitions section above, a disease risk indicator is an indicator of the likelihood of a particular disease or a class of diseases that grow within similar conditions. In some embodiments, the disease risk indicator is based on one or more weather parameters that are determined by the machine learning module (116) to correlate with crop diseases. The correlation may be learned by the machine learning module (116) upon training on public databases showing the levels of temperature and humidity over time that are required for a spore to inoculate its host. Published university research may point to favorable conditions for disease proliferation (see, for example, Pierce Anderson Paul, "*Epidemiology and predictive management of gray leaf spot of maize,*" *Ph.D. Thesis, Iowa State University*, 2003, available at https://dr.lib.iastate.edu/handle 20.500.12876/68099, which is hereby incorporated by reference in its entirety herein as if fully set forth herein). For example, the conditions favorable for gray leaf spot development are a temperature between 75 and 85° F. and a humidity above 90% (exposure time does not matter). The machine learning module may be trained to generate a positive disease risk indicator when such conditions are met.

In one embodiment, the temperature and humidity measurements received from various environmental sensors (104) located within a specific geographical region are monitored by the processing module (112) regularly (e.g., once every 15 minutes). Once a disease risk threshold is reached, a disease risk heatmap showing the geographical areas where the disease risk threshold was reached is updated and sent to the electronic device (118). In one embodiment, the coordinates within a geographical region of interest where the disease risk indicator has reached a pre-determined threshold are sent to the electronic device (118) at regular time intervals.

The training of the machine learning module (116) determines the scope of the generated disease risk indicator. As discussed above, the disease risk indicator may be disease-specific or generic to a group of diseases. In some embodiments, the disease risk indicator is further host-specific, i.e., it is specific to a particular type of crop (e.g., corn, soybean). In various embodiments, the disease risk indicator is generic to both the host and the disease, and is based on whether environmental conditions are present for inoculation of a group of host crops by a group of relevant diseases.

The disease risk indicator is another major indicator of crop field health and is based on pathogen incidence data observed from pathogen sensors and disease risk indicator data. The processing module (112) may thus further be configured to generate a disease score based on the disease risk indicator generated by the machine learning module (116) and the pathogen incidence indicator received from the pathogen sensor (106). The processing module (112) may be configured to store in the memory (114) and display the disease score on the electronic device (118). FIG. 1 shows an electronic device (118) displaying a disease score heatmap using disease score data received from the processing unit (112) via the network (108). In some embodiments, the disease score is displayed to a user through an electronic device (108) in a visual format. For example, the visual format may be a heat map overlaid on a geographical map of the crop area, where various colors of the heat map correspond to various disease scores.

In one exemplary embodiment, the input module (110) is configured to receive the historical weather data from the weather database (102) in order to determine the disease risk indicator and the disease score based on a pre-defined time window. In some embodiments, the pre-defined time window is based on the crop and the pathogen.

In a sample implementation, the user may monitor a set of adjacent fields where corn, soybean, wheat, cotton, peanuts, and rice are grown. The target disease and pathogen pairs that the user may monitor are shown in the table below for each crop.

| Crop Type | Target Disease | Pathogen |
| --- | --- | --- |
| Corn | Gray leaf spot | *Cercospora zeae-maydis* |
| Soybean | Soybean rust | *Phakopsora pachyrhizi* |
| Wheat | Powdery mildew | *Blumeria graminis* f. sp. *tritici* |
| Cotton | Leaf spot | *Cercospora gossypina* |
| Peanuts | Late leaf spot | *Nothopassalora personata* |
| Rice | Rice blast | *Magnaporthe oryzae* |

Although the environmental sensors used here were Meter Atmos 41 and Meter VP4 weather stations that were deployed in the target fields, the methods and systems described herein may be extended to other environmental sensor brands as well. The following table shows sample Meter Atmos 41 readings showing some of the relevant ambient weather parameter values recorded, along with their units, when applicable.

| Ambient Weather Parameter | Units | Sample Value |
| --- | --- | --- |
| Solar Radiation | $W/m^2$ | 4 |
| Precipitation | inches | 0 |
| Lightning Activity | — | 0 |
| Lightning Distance | miles | 0 |
| Wind Direction | degrees (°) | 34 |
| Wind Speed | mph | 0.18 |
| Gust Speed | mph | 0.47 |
| Air Temperature | ° F. | 71.7 |
| Relative Humidity (RH) | % | 32 |
| Atmospheric Pressure | kPa | 99.02 |
| Maximum Precipitation Rate | in/hr | 0 |
| RH Sensor Temperature | ° F. | 71.7 |

| Ambient Weather Parameter | Units | Sample Value |
| --- | --- | --- |
| Vapor Pressure Deficit (VPD) | kPa | 2 |
| IPF Water Content | — | −0.41 |
| Soil Temperature | °F. | 66.2 |
| Saturation Extract Electrical Conductivity (EC) | mS/cm | 0.002 |
| Wetness Level | — | 440 |
| Reference Pressure | kPa | 98.97 |
| Logger Temperature | °F. | 70.6 |

AgroMonitor (agromonitoring.com) and IBM Weather (www.ibm.com/products/weather-company-data-packages) were used as weather databases to gather historical temperature, humidity, and precipitation levels. The disease risk indicator machine learning module included a convolutional neural network (CNN) that was trained to generate Boolean disease risk values, where "0" and "1" represented the absence and presence of disease risk, respectively.

The pathogen sensors used were Scanit SporeCams capable of detecting the number of particles per unit volume (i.e., particle count per liter or per cubic meter) for several spore and pollen particle types. Using the computed disease risk indicator values and the received pathogen counts over time, the system generated a dynamic disease score value over time, using a method similar to the one described with reference to FIG. 4. In this case, the generated disease score was also Boolean, where "0" and "1" represented the absence and presence of disease, respectively.

Generating Disease Risk Indicators and Scores

To generate scalable and accurate disease risk indicators of airborne crop diseases for an area of interest and a point in time, the disease risk indicator is geospatially and temporally modeled, where higher output levels correspond to higher likelihoods of disease development. An initial focus was on determining and verifying disease risk indicators for the gray leaf spot and the Northern corn leaf blight, though broader applications to soybean rust and other diseases would be apparent to those skilled in the art. The creation of the temporal and geospatial disease-risk indicator includes two stages: (1) the development of an artificial intelligence (AI) model to predict time-dependent conditions that are conducive to disease, described by the machine learning module development process shown in FIG. 2, and (2) the deployment of the AI model to generate a map of disease risk for an area of interest at a specific time, as described by the process shown in FIG. 3.

Figure 2:
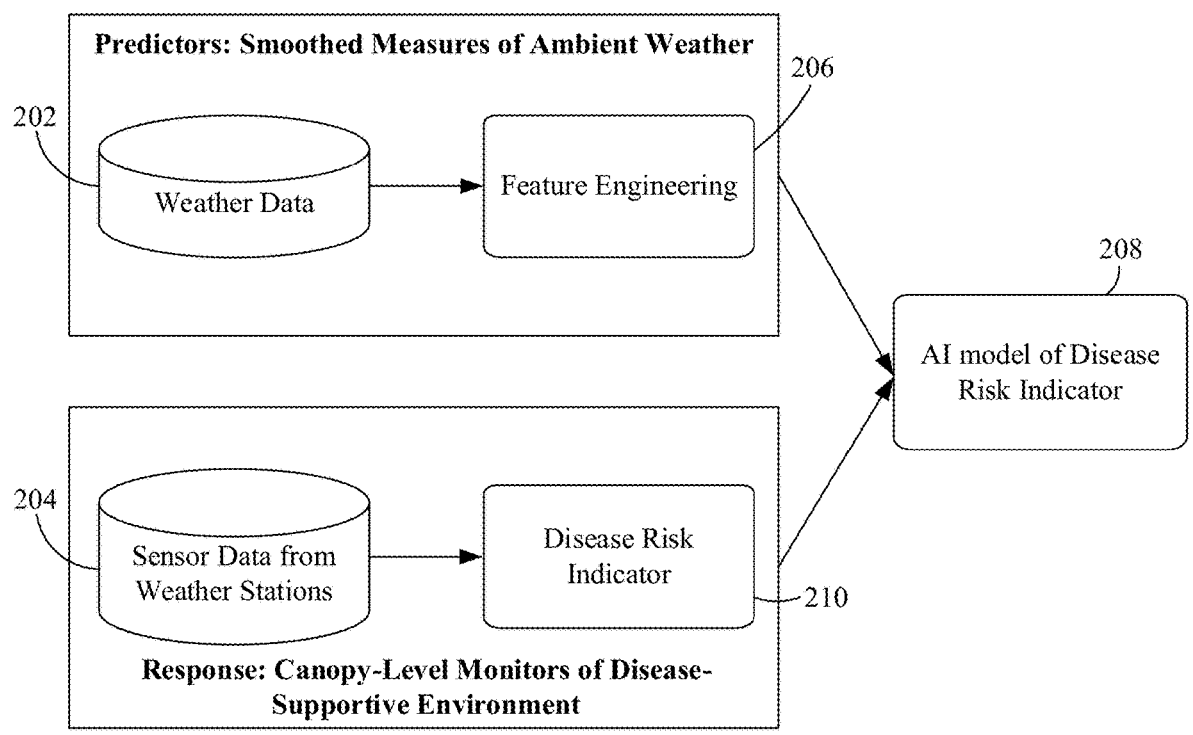
FIG. 2 is a block diagram showing the development of a machine learning module for generating a disease risk indicator, in accordance with an exemplary embodiment of the present invention.
Figure 3:
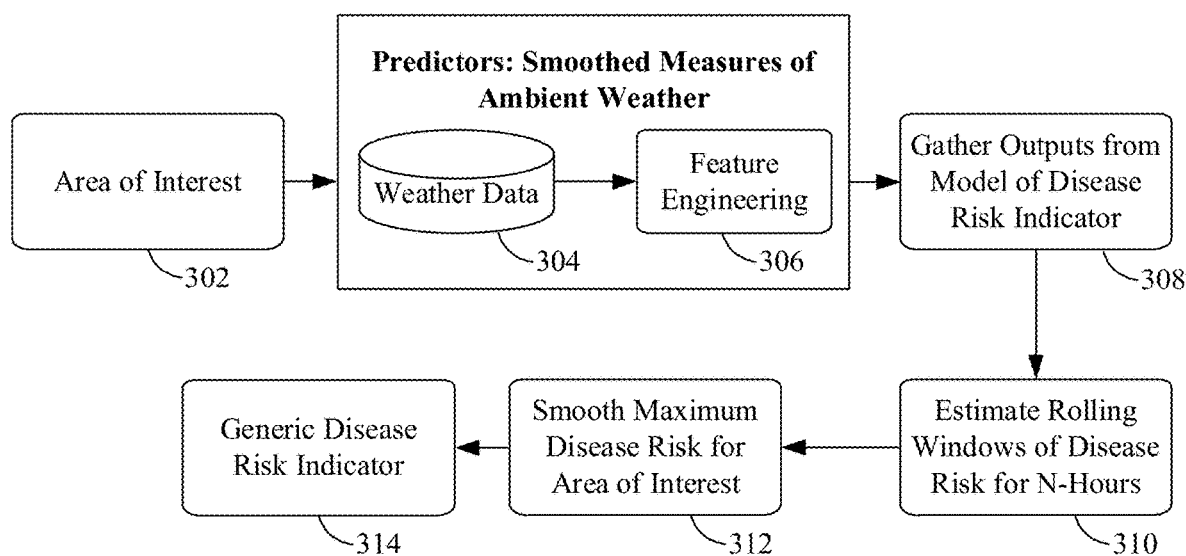
FIG. 3 illustrates a process for applying a machine learning module to generate a disease risk indicator, in accordance with an exemplary embodiment of the present invention.
Figure 5:
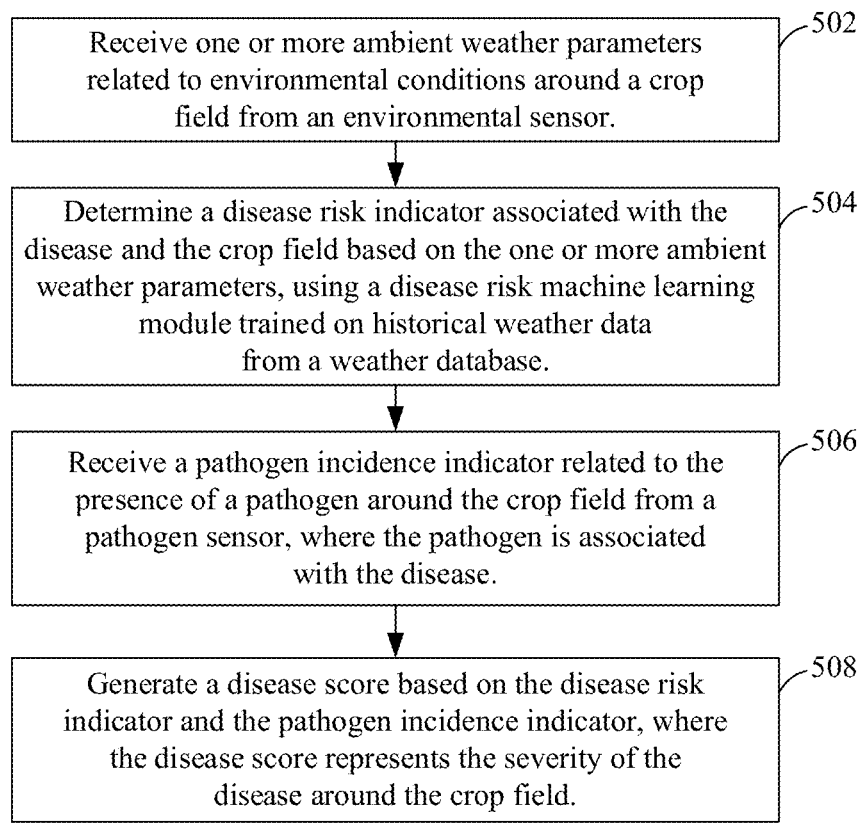
FIG. 5 illustrates a flow chart diagram for predicting a crop disease, in accordance with an exemplary embodiment of the present invention.
Figure 6:
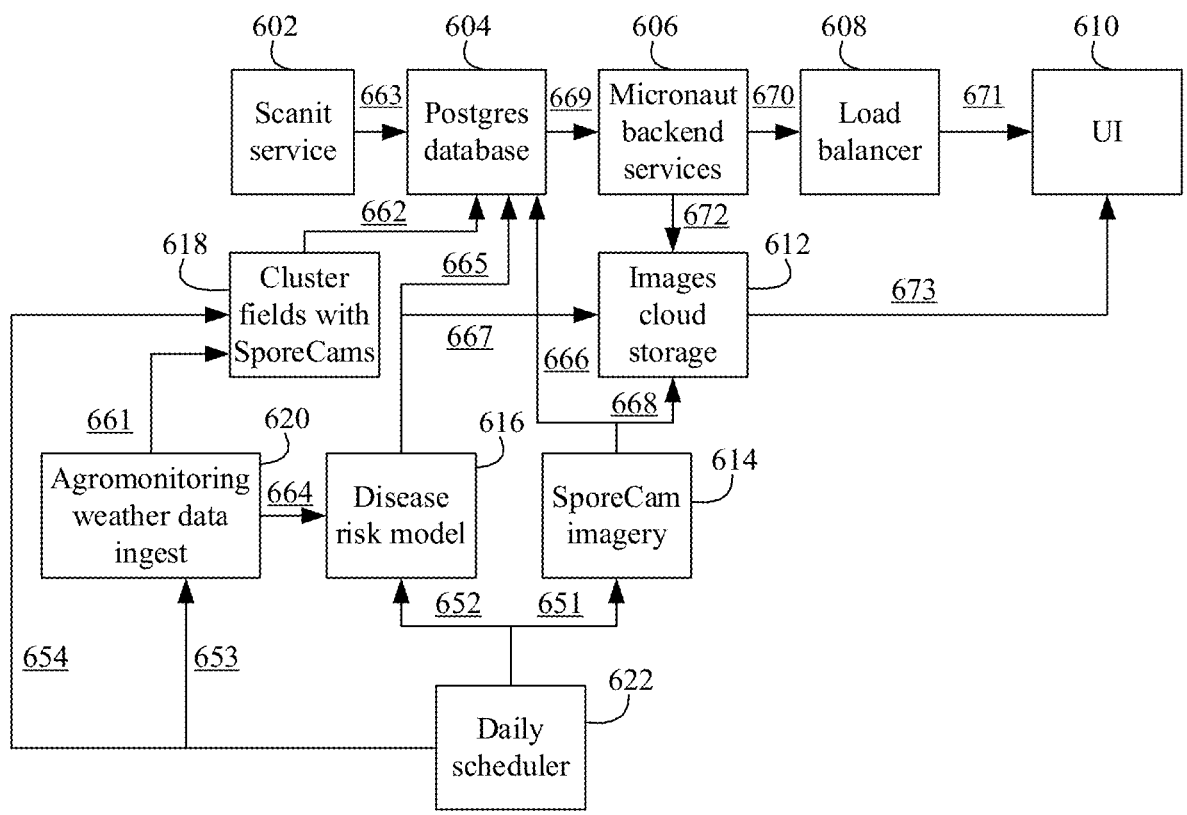
FIG. 6 illustrates a system integration to generate predictions of crop disease, in accordance with an exemplary embodiment of the present invention.

FIGS. 2, 3, 4, 5, and 6 describe in greater detail the components and operation of the real-time disease triangle monitoring and generation of a field-level disease score. FIGS. 2 and 3 show a process of using environmental sensor (104) readings and weather database (102) information to generate a disease risk indicator through a machine learning module (116), whereas FIGS. 4, 5, and 6 show a process for combining the generated disease risk indicator data with pathogen sensor (106) readings to generate a disease score.

FIG. 2 is a block diagram showing the development of a machine learning module for generating a disease risk indicator, in accordance with an exemplary embodiment of the present invention. The machine learning module is an AI model to generate a disease risk indicator (208) and may be trained to predict a disease risk indicator (210) using historical weather data sets (202), ambient weather parameter data sets (204), and ground-truth disease risk indicator data (210). In some embodiments, the training weather and sensor data may originate from field-level environmental sensors or from a weather database offered by a weather service.

In one embodiment, synthetic ground-truth disease risk indicator data may be generated from sensor data (e.g., Atmos environmental sensor readings similar to the one depicted above). In this embodiment, known conditions for disease occurrence from university research may be used to generate synthetic disease risk values from historical weather data in order to train the machine learning module (116). In another embodiment, disease risk indicator ground truth data sets may be generated from existing historical data of disease occurrence.

In various embodiments, the objective of the machine learning module of FIG. 2 is to generate scalable and accurate risk indicators of airborne crop diseases for an area of interest and a point in time, where disease risk is geospatially and temporally modeled with higher scores corresponding to higher likelihoods of disease development. In some embodiments, a feature engineering process (206) may include the smoothing of historical weather data sets (202), thereby extracting features for disease prediction. Diverse data summarizations operated on the weather data (202) may include, but are not limited to, the computation of minimums, maximums, means, and ranges. Permutations of variables with their summarizations may also be carried out. Details regarding the feature engineering process (206) are further described with reference to FIG. 3.

In some embodiments, ambient weather parameters from weather stations (204) may be aggregated and geospatially-temporally matched to the disease risk indicator (210). Hourly weather data from a weather source (e.g., AgroMonitor) may be leveraged as a source for sensor data (204). In some embodiments, summarizations of the sensor data (204) may be carried out, including but not limited to the computation of minimums, maximums, means, medians, modes, and ranges. In one embodiment, data summarization is provided by the weather source, the weather service provider, or the weather station.

Finally, the features extracted from the feature engineering process (206) and the disease risk indicator (210) are combined to develop an AI model (208) to generate a time-dependent disease risk indicator predicting time-dependent conditions that are conducive to disease. In some embodiments, the ground-truth disease risk indicator data (210) may be derived from ground-truth measurements of disease through monitors of canopy conditions (e.g., corn canopy conditions), such as software applications delivering canopy conditions from satellite and drone imagery. In one embodiment, canopy conditions may be monitored using a drone with a thermal sensor, such as the Mavic-2 Enterprise drone (specifications available at www.dji.com/mavic-2-enterprise, and hereby incorporated by reference in their entirety herein as if fully set forth herein). In another embodiment, canopy conditions may be monitored using passive microwave sensors, which provide unique insight into measuring water content in soils and vegetation. This type of monitoring is on par with ground sensors, but enjoys sharper spatial resolution and avoids the hassle of maintaining an instrument in the field. Passive microwave sensor feeds are available commercially through providers such as Planet Labs PBC (product description available at www.planet.com/pulse/introducing-planetary-variables-soil-water-content-land-surface-temperature-and-vegetation-biomass and hereby incorporated by reference in its entirety herein as if fully set forth herein).

In some embodiments, the severity of diseases measured for ground-truth data may be indicated using standard university rating scales for disease. For instance, multiple disease rating scales are described in Paul Vincelli and Donald E. Hershman, *Assessing Foliar Diseases of Corn, Soybeans, and Wheat—Principles and Practices, Plant Pathology Fact Sheet*, PPFS-06, University of Kentucky, November 2011 (available at plantpathology.ca.uky.edu/files/ppfs-misc-06.pdf, and hereby incorporated by reference in its entirety herein as if fully set forth herein). For example, the scale may be integers ranging from 1 to 10, with "1" corresponding to "slight disease" and "10" corresponding to "severe disease." The amount of actual crop loss may be measured through physical scouting and rating, where a scout may inspect the field to determine disease cause and severity.

The machine learning module (208) may be implemented via several approaches. In some embodiments, a random forest model may be used. In such embodiments, the random forest comprises several (generally a large number, e.g., 260) individual decision tree models that operate as a single ensemble. Each tree model has a maximum depth (e.g., 6). Each individual tree model in the random forest generates a class prediction, and the identified class with the highest votes is the ensemble model's prediction. In other embodiments, a model using LSTM (long-short term memory) is described below in reference to FIGS. 7 and 8. Several AI approaches such as recurrent neural networks (RNNs), support-vector machines (SVM), AdaBoost, and gradient boosting may also be applied to implement the disease risk indicator machine learning module (208). In some embodiments, the RNN is a bidirectional long short-term memory (LSTM) neural network.

FIG. 3 illustrates a process for applying the machine learning module described with reference to FIG. 2 to generate predictions of disease risk in a crop field of a crop, in accordance with an exemplary embodiment of the present invention. This process may ultimately result in a map showing disease risk indicator levels in a geographical area corresponding to a user's area of interest. At step (302), an area of interest corresponding to the geographical area where crop disease prediction is to be performed is selected by a user, typically using an electronic device. The area of interest (302) usually englobes the user's crop fields. In some embodiments, a time window is also specified stretching from planting time to as late as stage V12 of crop development. In corn agronomy, stage V12 corresponds to the determination of actual kernel rows, 42 to 46 days after emergence (815 GDD). The area of interest and the time-window specify geographically and temporally the historical weather data that is relevant for predicting disease risk.

At step (304), weather data from one or more weather databases (see FIG. 1) is selected based on the specified area of interest (and, optionally, the specified time-window), to form the weather data required for predicting disease risk. At step (306), the weather data is input into a feature engineering process, as discussed in the context of FIG. 2. At step (308), the disease risk machine learning module is configured to generate a disease risk indicator by combining ambient weather parameter data with the feature-engineered historical weather data received from the weather database (306).

At step (310), the N-hour continuous window of disease risk indicator (308) output values immediately preceding a query time are aggregated, where N is any positive real number, to form a real-time rolling window. The size of the real-time rolling window (i.e., N hours) is flexible and may be tailored to factors such as the disease type, the crop, the geographic area, the crop field, and the user. In general, a real-time rolling window comprises at least two consecutive disease risk indicator output values. In one embodiment, disease risk indicators may be measured and aggregated for a 72-hour continuous real-time rolling window (i.e., N=72). In this case, the disease risk indicator represents the likelihood that environmental conditions are favorable for the development of a particular disease within a 3-day period immediately preceding a query date.

At step (312), a smoothing of the most prevalent disease risk in the specified area of interest (302) is performed. For example, filtering by a rolling average may be employed. The filtering of a maximum disease risk for the area of interest (302) is valuable as it yields a generic disease risk indicator (314) (i.e., a disease risk indicator predicting more than one crop disease). Conversely, the smoothing of step (312) may be reduced or skipped if a more disease-specific risk indicator is required.

In one test scenario, a swath of Illinois was mapped for the growing season, and the disease risk indicator model was applied every hour between May 1 and a subsequent query date. The disease risk was calculated for a 72-hour continuous real-time rolling window to predict a risk indicator for diseases such as Northern leaf blight and gray leaf spot. FIGS. 10-15 show sample resulting disease risk, pathogen, and disease maps. In some embodiments, the disease risk map is dynamic by nature and targets consecutive hours of continuous disease supportive conditions. In some embodiments, the disease risk map adapts to a user's planting schedules and how the user's crop develops. For example, the frequency of disease risk indicator generation and the size of the real-time rolling window may vary through the crop season, following planting schedules and crop development.

The disease risk indicator is also dynamic in that it adapts to input parameters. For example, including the crop planting date and the crop's growth stage (e.g., based on GDD) in the machine learning module's input parameters will enable useful dynamic correlations with disease risk. For example, if the GDD on corn is around 700, it is likely the growth stage is at V8, indicating canopy closure. Since closed canopy changes the environmental conditions of the field, hence making the crop planting date, the GDD, and/or the growth stage powerful input parameters for the machine learning module.

FIG. 4 illustrates another process for applying a machine learning module to generate predictions of crop disease, in accordance with an exemplary embodiment of the present invention. This process takes a generic disease pressure output (402) from the process shown in FIG. 3 and combines it with pathogen sensor (e.g., spore collection device) data to achieve a final disease-specific risk score. Once a generic disease risk indicator map is generated, the logic outlined with reference to FIG. 4 determines the final disease-specific score for each grid (or unit area) of the map.

First, at step (402), a generic disease pressure output is received by a disease specific logic unit (416) from the machine learning module described in FIG. 2. In some embodiments, the generic disease pressure output (402) was generated by filtering the maximum disease for the area of interest (302) to create a generic disease pressure map, i.e., a general map depicting weather conditions conducive to disease regardless of pathogen data (see FIG. 3). At step (404), a gridded disease risk indicator output and its location (e.g., latitude and longitude) enable the logic unit to identify a nearest pathogen sensor based on the locations of various available sensors. In one embodiment, the user selects the nearest pathogen sensor. In some embodiments, a gridded crop region has a size of around 80 acres. At step (406), the disease specific logic unit confirms whether the nearest pathogen sensor is outside a predefined distance threshold or not (406). If the answer is "YES" at step (406), the logic unit proceeds to step (408), where the logic unit outputs the disease risk indicator value for all disease types as "No Data" (408). However, if the answer is "NO" at step (406), then the logic unit proceeds to step (410), where it confirms whether the disease spore has a positive count or not (410). If the answer is "NO" at step (410), the logic unit proceeds to step (412), where the logic unit outputs that the disease pressure value for that disease at the current grid point is "Zero." However, if the answer is "YES" at step (410), then the logic unit proceeds to step (414), where it verifies that the disease pressure value for that disease at this grid point has a positive value (414). If the disease risk indicator at the current grid point is positive, an output disease score is generated. The generic disease risk indicator (402) and the nearest pathogen sensor data are therefore combined to provide a final disease-specific output score at the current grid point.

The predefined distance threshold (406) used to determine pathogen sensor proximity is highly dependent on the crop, terrain, and canopy density. In the example above, where the gridded crop region has a size of around 80 acres, the predefined distance threshold may be the grid side (~570 m, ~1870 ft) or diagonal (~800 m, ~2,624 ft). In some embodiments, pathogen sensors placed in hot spots of potential disease events may be as close as 20 to 40 m apart.

The disease score in the current grid point is a function of the disease risk indicator. In one embodiment, the disease score is equal to the disease risk indicator. In another embodiment, the disease score is proportional to the disease risk indicator.

In one example, the nearest pathogen sensor is identified for a grid point with a positive generic disease pressure value, where the pathogen sensor is indeed within the predefined distance threshold. Furthermore, the pathogen sensor captures spore counts associated with two disease types, Northern corn leaf blight and soybean rust, with the spore counts being 0 and 20, respectively. As a result, the final disease score value for the Northern corn leaf blight has zero value, whereas the final disease score value for soybean rust is a positive value (e.g., "1"), indicating the presence of soybean rust. Hence, in the embodiment of FIG. 4, both pathogen presence and a non-zero disease risk indicator are required to have a positive disease score. Therefore, a high disease risk indicator may be ignored if there are no pathogens (the disease score output is zero). Similarly, if pathogens are present and the disease risk indicator is zero, the output disease score will also be zero.

In one embodiment, multiple disease maps (one for each disease type) are generated, where the disease score values, in areas exhibiting a non-zero pathogen count, are equal or proportional to the generic disease risk indicator values. Note that the presence of a pathogen in the absence of certain environmental conditions (i.e., zero disease risk indicator) would not lead to a positive disease score. In some embodiments, the presence of a pathogen is reported, even when there is no measured risk for the disease.

The process shown in FIG. 3, therefore, generates a generic disease risk indicator output, whereas the process shown in FIG. 4 generates an area-specific, pathogen-specific disease score. Thus, the pathogen-disease dependence may be absent in the process shown in FIG. 3. The process of FIG. 3 may be useful in circumstances where pathogen-specific indicators/pressures may lead to pathogen-specific spore counts. Similarly, a pathogen may be present in an area where the disease risk indicator is low. In some embodiments, the disease risk indicators related to different pathogens may be correlated for many of the pathogens of interest, hence the importance of a generic disease risk indicator.

When conditions in the processes shown in both FIG. 3 and FIG. 4 are met, the combination may trigger a report. In some embodiments, each of processes independently may be actionable with shortcomings, but when the two processes are combined, the result is a complete disease triangle.

In some embodiments, pathogen incidence data may comprise other ground sources such as scouting data. In one embodiment, crowdsourced and shared data emanating from pathogen and/or disease detection and recognition applications may also be used as pathogen incidence data, where the pathogen and/or disease recognition applications may be based on pathogen and/or disease image processing. Therefore, various sources pathogen incidence data may be combined with disease risk indicators in order to improve the accuracy of the output disease score. In yet another embodiment, a second machine learning module may be trained to generate disease scores from disease risk indicator and pathogen incidence data.

FIG. 5 illustrates a flow chart diagram for predicting a crop disease, in accordance with an exemplary embodiment of the present invention. In step 502, one or more ambient weather parameters related to environmental conditions around a crop field is received from an environmental sensor. In step 504, a disease risk indicator associated with the disease and the crop field is determined, based on the one or more ambient weather parameters, using a disease risk machine learning module trained on historical weather data from a weather database. In step 506, a pathogen incidence indicator related to the presence of a pathogen around the crop field is received from a pathogen sensor, where the pathogen is associated with the disease. Finally, in step 508, a disease score is generated based on the disease risk indicator and the pathogen incidence indicator, where the disease score represents the severity of the disease around the crop field.

FIG. 6 illustrates a system integration to generate predictions of crop disease, in accordance with an exemplary embodiment of the present invention. In the system integration, a daily scheduler (622) controls the synchronization of various components through links (651-654), a Scanit service (602) is a pathogen database containing pathogen sensor data (e.g., SporeCam data), and Agromonitoring weather data (622) refers to an open weather data service such as AgroMonitor. Scanit (602) may provide only pathogen detection. A disease may be predicted from the detection of a pathogen if the environment is conducive for this pathogen to inoculate the crop. Therefore, once the inoculum infects the plant, we may consider the crop to be afflicted with the disease.

The following steps illustrate an exemplary flow of information across the system, according to one embodiment of the present invention. Weather information from the Agro-Monitor service (620) flows to a set of cluster fields with pathogen sensors (618) (e.g., SporeCams) through link 661. In turn, the pathogen sensors (618) generate pathogen information to send to a unified database (604) (e.g., a Postgres or PostgreSQL database) through link 662. The Scanit service (602) also sends pathogen database information to the unified database through link 663. Using link 664, the AgroMonitor (620) also sends weather information to a disease risk model (616). The disease risk model (616) then sends a disease model profile to the unified database (604) through link 665. A set of pathogen images (e.g., SporeCam imagery) (614) is also sent to the unified database (604) through link 666. The disease model profile and pathogen imagery may also be sent to a cloud storage unit (612) using links 667 and 668.

The unified database (604) then uses the weather information from the AgroMonitor (620), the pathogen information from the set of cluster fields (618), the disease model profile from the disease risk model (616), and the set of pathogen images (614) to send information to a backend service (e.g., Micronaut) (606) through link 669, which in turns sends information to a load balancer (608) using link 670. Information from the load balancer (608) is then displayed on a user interface (UI) (610) at step 671. Using link 672, the backend service (606) may also send images to the cloud storage unit (612). The images in the cloud storage unit (612) may then be displayed on the user interface (610) through link 673.

Machine Learning Architecture, Training, and Validation

Figure 7:
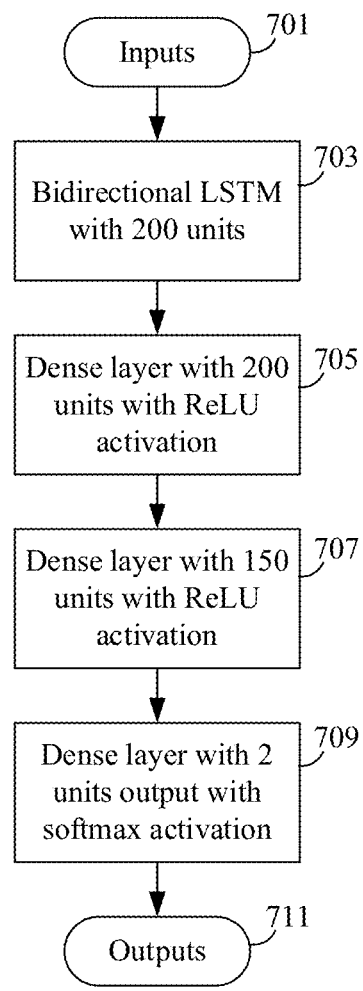
FIG. 7 illustrates a LSTM (long-short term memory) model architecture for implementing machine learning modules, in accordance with an exemplary embodiment of the present invention.

FIG. 7 illustrates a LSTM (long-short term memory) model architecture for implementing machine learning modules, in accordance with an exemplary embodiment of the present invention. In step 701, a set of inputs (710) is assembled. In some embodiments, the input (710) is a weather feature vector. In some embodiments, the weather feature vector is of size 24 by 240, where 24 values come from 6 weather attributes, including temperature, heat index, atmospheric pressure, humidity, wind speed, and cloudiness, and each weather attribute corresponds to 4 summary statistics, including minimums, maximums, means, ranges, etc., and 240 refers to the number of hours in a 10-day period. Next, in step 703, the set of inputs (701) is fed into a bidirectional LSTM model with 200 units (703). In step 705, the output of the bidirectional LSTM model (703) is fed into a first dense layer with 200 units with a rectified linear unit (ReLU) activation function (705). In step 707, the output of the first dense layer (705) is fed into a second dense layer with 150 units with a ReLU activation function (707). In step 709, the output of the second dense layer (707) is fed into a third dense layer with two units with softmax activation (709). Finally, the output (step 711) is collected from the third dense layer (709). In some embodiments, this model compiles with binary cross-entropy loss.

Figure 8:
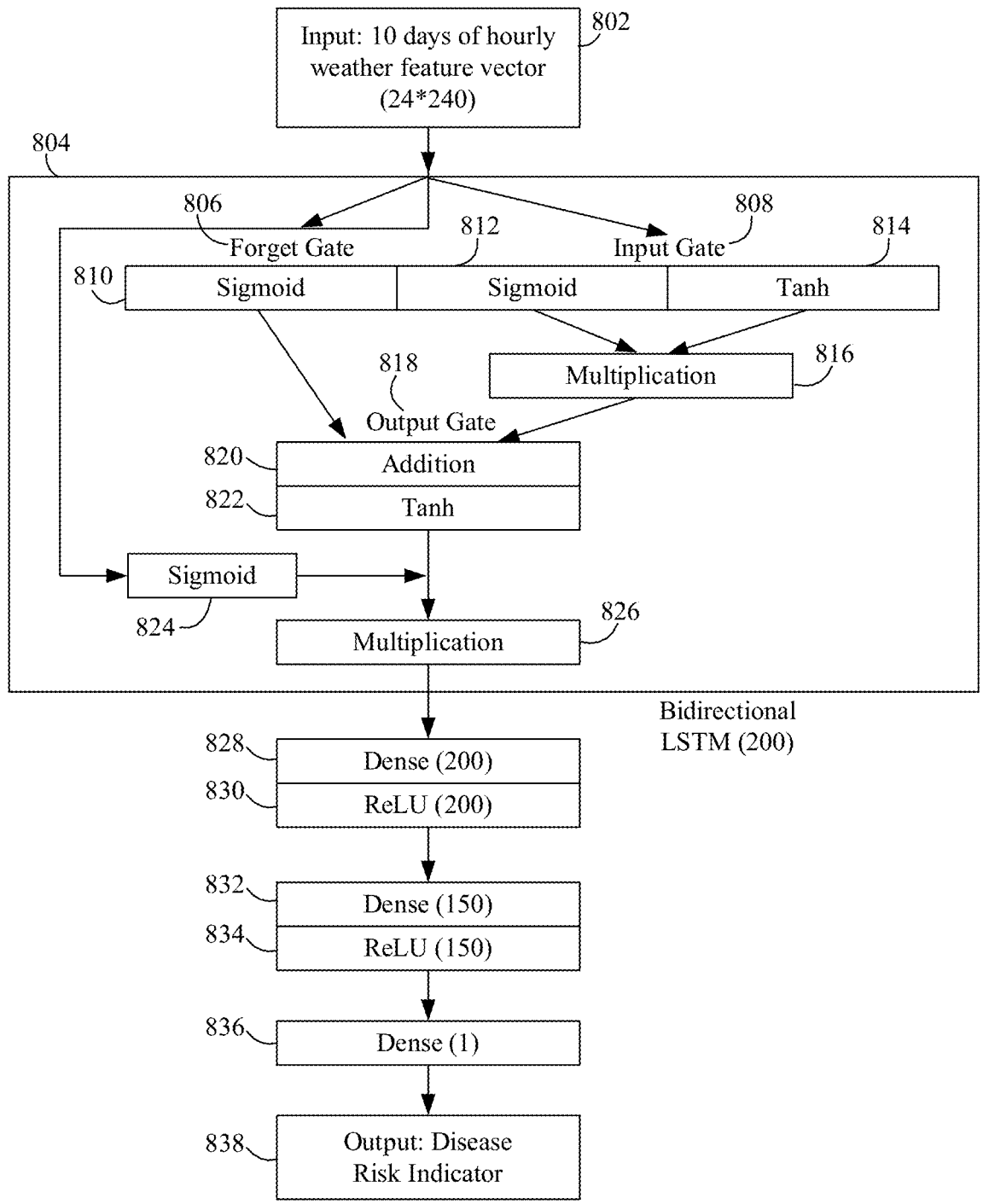
FIG. 8 illustrates further details of an LSTM (long-short term memory) model architecture for implementing machine learning modules, in accordance with an exemplary embodiment of the present invention.

FIG. 8 illustrates further details of the LSTM (long-short term memory) model architecture for implementing machine learning modules, in accordance with an exemplary embodiment of the present invention. In step (802), the input is a weather feature vector. In some embodiments, the weather feature vector is of size 24 by 240, where 24 values come from 6 weather attributes, including temperature, heat index, atmospheric pressure, humidity, wind speed, and cloudiness, and each weather attribute corresponds to 4 summary statistics, including minimums, maximums, means, ranges, etc., and 240 refers to the number of hours in a 10-day period. In the next step, the input (802) is fed into a bidirectional LSTM model (804) with 200 units. The bidirectional LSTM model (804) comprises several gates: an input gate (808), a forget gate (806), and an output gate (818). The input (802) is fed into the input gate (808), where information is passed to a first sigmoid function (812), and a first tanh function (814) respectively. The output value generated by the first sigmoid function (812), and the first tanh function (814) are fed into a first multiplication unit (816). Further, the input (802) is also fed to the forget gate (806). The forget gate (806) decides what information needs to be kept for further processing and what information may be ignored. The input (802) is passed into a second sigmoid function (810) of the forget gate (806), which generates values between 0 and 1. The output from the multiplication unit (816) and the output from the forget gate (806) are fed into the output gate (818), where the information is passed to an addition unit (820) followed by a second tanh function (822). The output gate (818) control which pieces of information in the current state to output by assigning a value from 0 to 1 to the information. Also, the input (802) is passed into a third sigmoid function (824). In the next step, the output of the second tanh function (822) and the output of the third sigmoid function (824) are fed into a second multiplication unit (826). The output of the second multiplication unit (826) is then the output of the bidirectional LSTM model (804).

In the next step, the output of the second multiplication unit (826) is fed into a first dense layer (828) with 200 units with a rectified linear unit (ReLU) activation function (830). In the next step, the output of the first dense layer (828) is fed into a second dense layer (832) with 150 units with a ReLU activation function (834). In the next step, the output of the second dense layer (832) is fed into a third dense layer (836) with one unit. Finally, the output (838) of the system is collected from the third dense layer (836). In some embodiments, this output is a disease risk indicator. Note that LSTM neural networks are a class of recurrent neural networks (RNNs), so in some embodiments, the features disclosed with respect to FIGS. 7 and 8 may be generalized to other types of RNNs more broadly.

Part of the disease-supportive indicator (210) relies on the accurate capture of canopy-level conditions. In an exemplary execution of the AI model (208), diverse cross-validation techniques were employed to assess the inferences of AI models (208) of these canopy measures applied to diverse years and geographies.

FIG. 9 illustrates a diverse stratified random sampling employed to assess accuracy of the measures of canopy environment, in accordance with an exemplary embodiment of the present invention. In some embodiments, validating one or more ambient weather parameters related to environmental conditions may be performed using stratified random sampling. In building the AI models (208), the response, called Y, corresponds to ground-truth measures of canopy-level conditions such as, but not limited to, humidity, temperature, and measures of leaf quality. Probes were randomly installed across central Illinois and several growing seasons to capture these values. To predict Y, broadly available ambient weather data and forecasts, called X, were consumed and geo-located with the probes. Note that the probes deployed for this study included ATMOS 22, ATMOS 41, VP-4, and Phytos 31, and X comprised ambient weather data, elevation, and soil conditions. All data were summarized into 15-minute intervals. AgroMonitor was used for weather data, DEM10 was used for elevation, and SSURGO was used for soil conditions. Leave-one-year-out (902), leave-one-field-out (904), and leave-one-field-year-out (906) cross-validation methods were employed. 30% of the fields were randomly chosen to be part of the X fields. Y includes one year of training data.

Graphical User Interface Implementations

FIGS. 10, 11, 12, 13, 14, and 15 represent various graphical user interfaces (GUIs) showing how disease risk indicator, pathogen incidence, and disease score data is overlaid on maps displayed on a user device, according to embodiments of the present invention.

Figure 10:
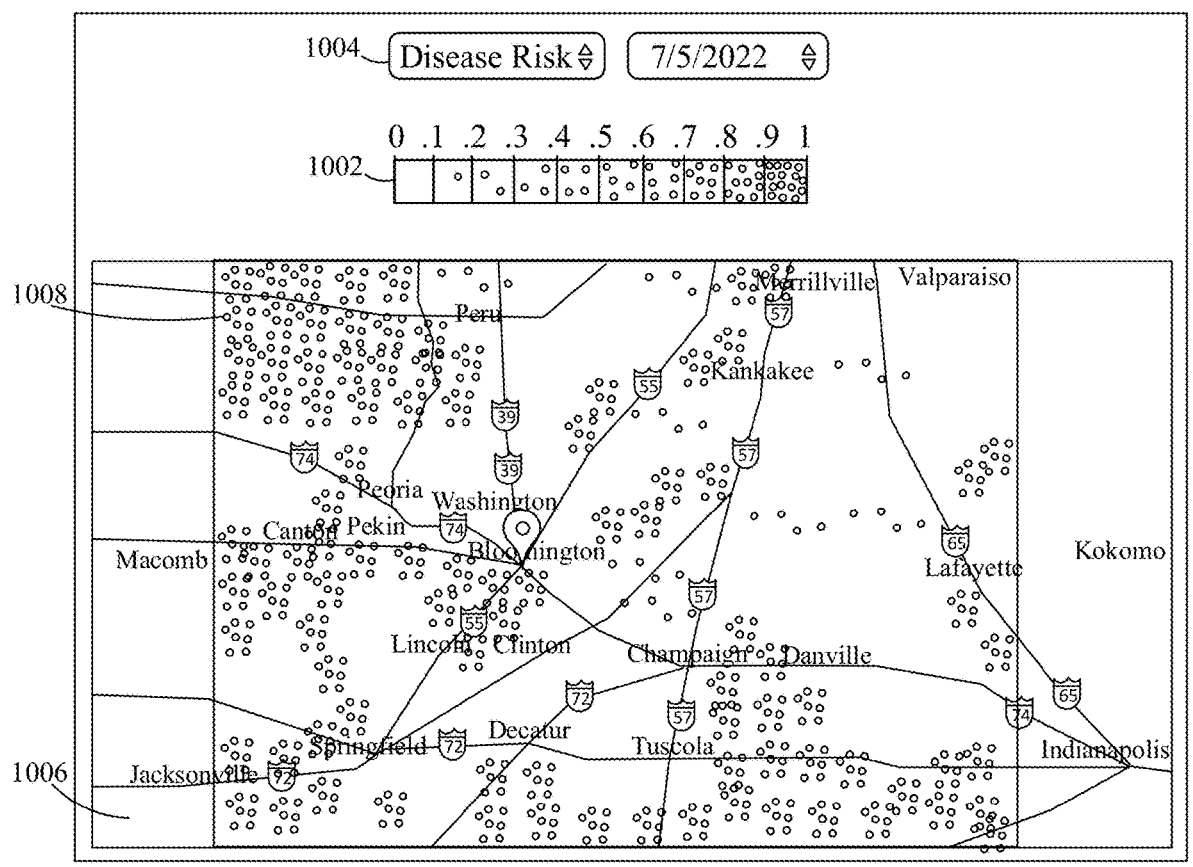
FIG. 10 illustrates a disease risk heat map, in accordance with an exemplary embodiment of the present invention.

FIG. 10 illustrates a disease risk heat map, in accordance with an exemplary embodiment of the present invention. In some embodiments, the disease risk map shows the disease risk indicator values generated by the disease risk machine learning module in a geographical location selected by the user, where the disease risk machine learning module uses the historical weather training data gathered for the region, as well as the ambient weather parameters received from the environmental sensors located within the selected map area. In the embodiment of FIG. 10, the disease risk indicator map may be selected on the user device using a drop-down menu (1004). A scale (1002) shows the disease risk indicator, representing the likelihood of disease risk at any specific area of the map. In the embodiment of FIG. 10, the scale (1002) shows disease risk indicator values that are positive real numbers ranging from 0 to 1. The disease risk heatmap thus allows the user to distinguish areas where the disease risk is low (1006) from areas where the disease risk is high (1008).

In some embodiments, the disease risk indicator values update regularly (e.g., daily). In one embodiment, the disease risk indicator values update each time a new disease risk indicator is computed and saved to a server connected to the user device. In one embodiment, the latest disease risk indicator values are sent to the user device at a frequency selected by the user. Note that the disease risk indicator heatmap of FIG. 10 does not specify a particular crop disease, indicating that it may be generic to multiple crop diseases. In one embodiment, the user specifies the class of crop diseases of interest (e.g., diseases relevant to the crops grown on the user's field) among parameters of an application in the user device. In some embodiments, the disease risk indicator values are overlaid on a map received by the user device from a commercial map provider (e.g., Google Maps).

Figure 11:
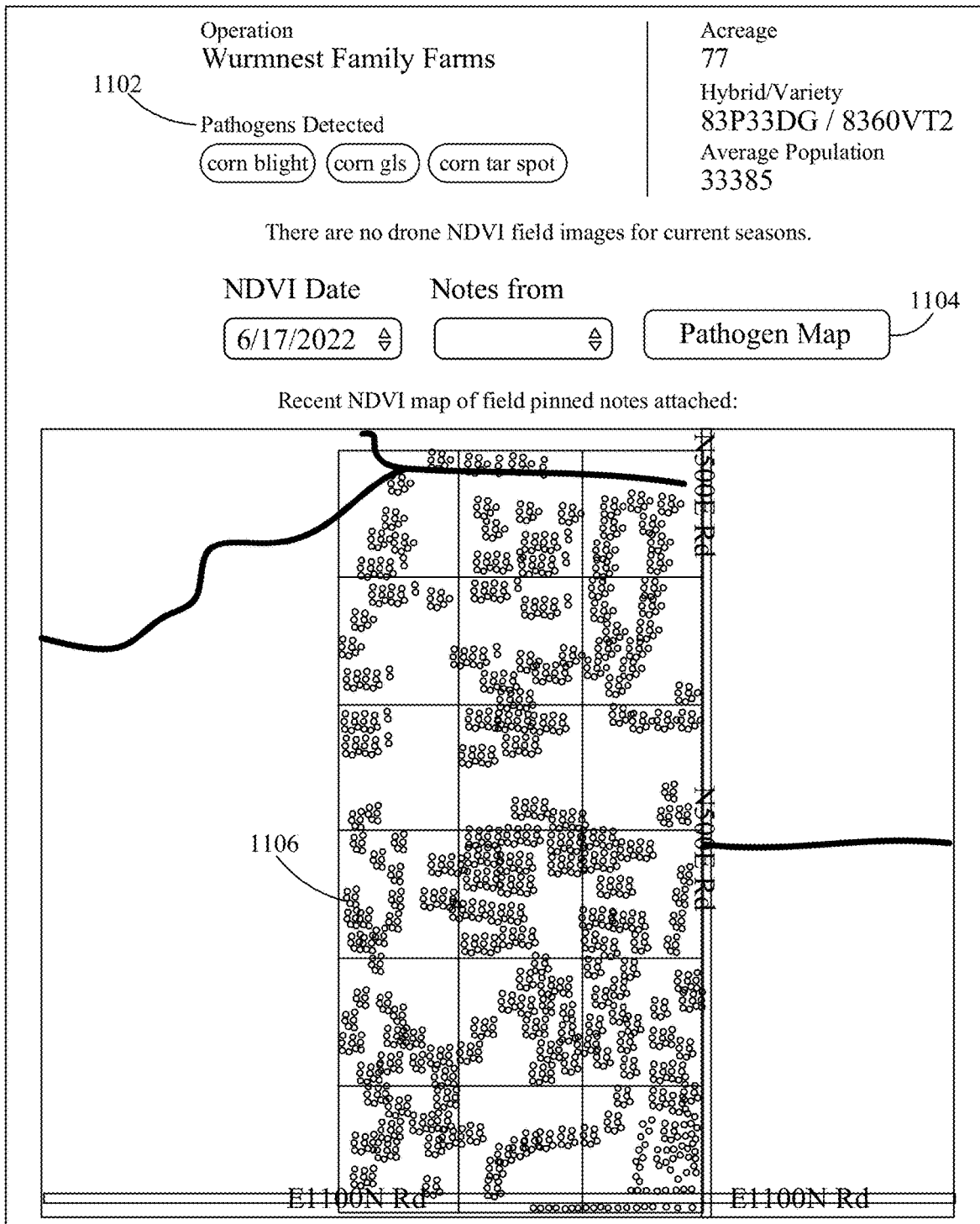
FIG. 11 illustrates the detection of various pathogens in a mapped area, in accordance with an exemplary embodiment of the present invention.

FIG. 11 illustrates the detection of various pathogens in a mapped area, in accordance with an exemplary embodiment of the present invention. The GUI of FIG. 11 includes a list of pathogens (1102) detected in the vicinity of a target field selected by the user on their device. In the embodiment of FIG. 11, the pathogen map may be selected on the user device using a drop-down menu (1104). In one embodiment, for any geographical area selected by the user, the device displays the pathogen incidence indicator detected by the pathogen sensors located within the selected geographical area. In some embodiments, each dot or shaded area on the map (1106) represents the pathogen incidence indicator generated by one pathogen sensor. In one embodiment, each dot on the map (1106) represents a positive pathogen reading from one pathogen sensor. In some embodiments, the density of each shaded area on the map (1106) is proportional to the number of pathogen particles per unit volume detected by a pathogen sensor.

In some embodiments, the pathogen incidence indicator values update regularly (e.g., daily). In one embodiment, the pathogen incidence indicator values update each time a new pathogen incidence indicator is received and saved to a server connected to the user device. In one embodiment, the latest pathogen incidence indicator values are sent to the user device at a frequency selected by the user. In some embodiments, the pathogen incidence indicator values are overlaid on a map received by the user device from a commercial map provider (e.g., Google Maps).

Figure 12:
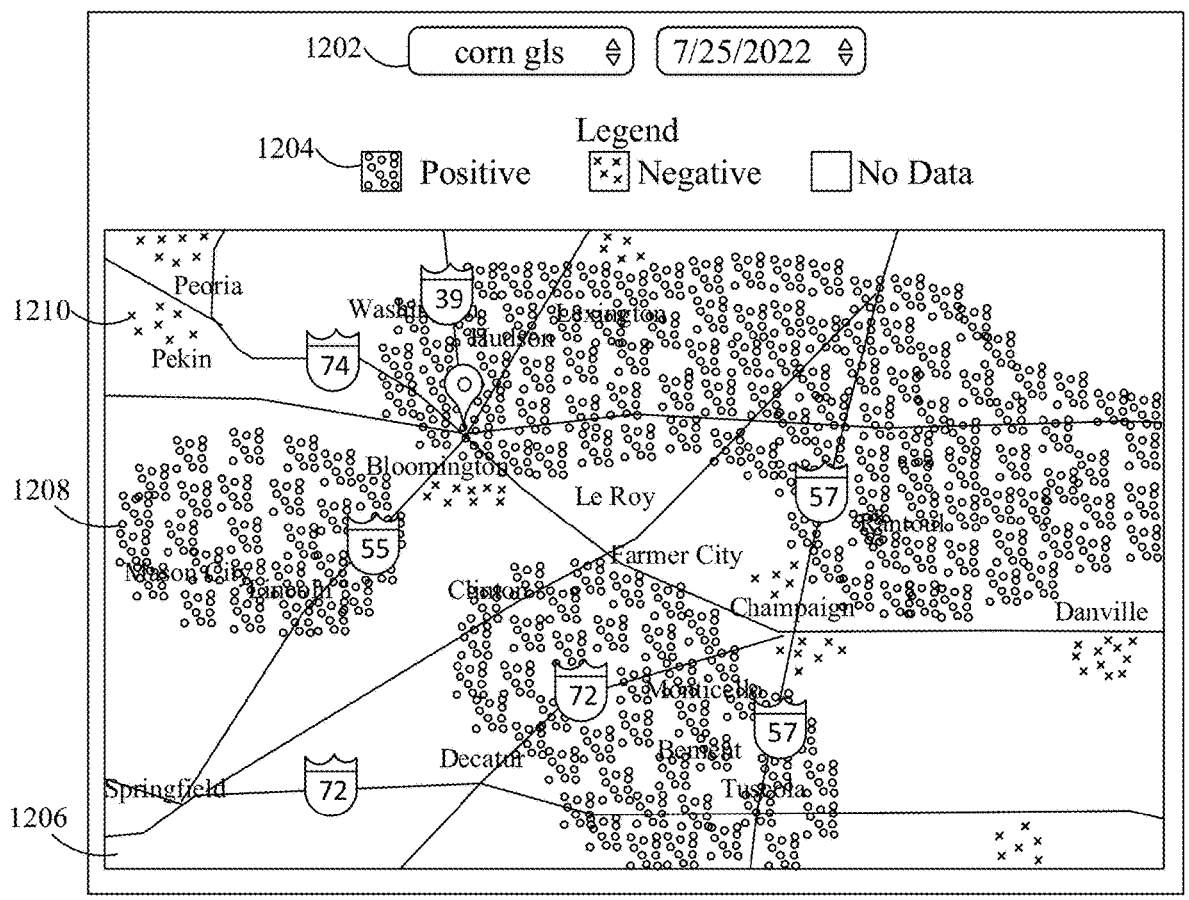
FIG. 12 illustrates a disease heat map for corn gray leaf spot (GLS), in accordance with an exemplary embodiment of the present invention.
Figure 13:
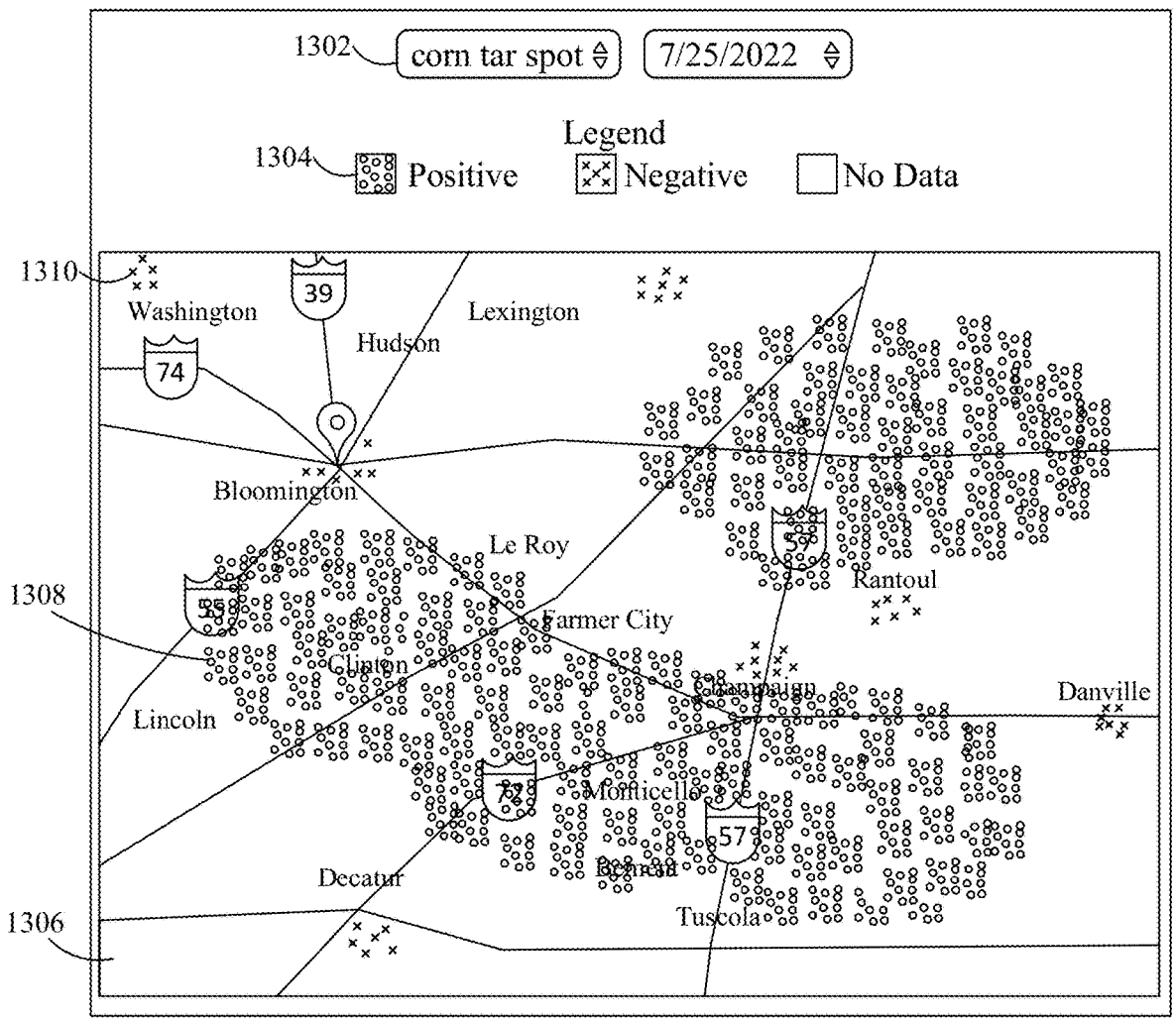
FIG. 13 illustrates a disease heat map for corn tar spot, in accordance with an exemplary embodiment of the present invention.

FIG. 12 illustrates a disease heat map for corn gray leaf spot (GLS), in accordance with an exemplary embodiment of the present invention. Similarly, FIG. 13 illustrates a disease heat map for corn tar spot, in accordance with an exemplary embodiment of the present invention. In one embodiment, the disease heat maps show the disease score values for corn GLS (FIG. 12) and corn tar spot (FIG. 13), as computed within a geographical area selected by the user. In the embodiments of FIGS. 12 and 13, the geographical area is approximately identical, and the disease heatmap for the target disease is selected for display on the user device using a drop-down menu (1202 and 1302). A legend (1204 and 1304) shows the possible disease score levels. In the embodiments shown in FIGS. 12 and 13, the legends (1204 and 1304) show three possible values for the disease score: "Positive," "Negative," and "No Data," where "Positive" indicates the presence of the selected disease (e.g., 1208 and 1308), "Negative" indicates the absence of the selected disease (e.g., 1210 and 1310), and "No Data" indicates missing data relative to the disease selected by the user (e.g., 1206 and 1306). In some embodiments, this three-tier disease score was generated for each point on the map using the disease-specific logic unit (416) shown in FIG. 4, and the missing data yielding the "No Data" evaluation indicates the absence of a pathogen sensor within a threshold distance of the geographic location shown on the map.

In the embodiments of FIGS. 12 and 13, the legends (1204 and 1304) use different patterns for the disease score levels. In one embodiment, the patterns may be replaced with point clouds shaded with a different color for each of the three disease score types: "Positive," "Negative," and "No Data." In another embodiment, the patterns may be replaced with semi-transparent overlay areas shaded with a different color for each of the three disease score types: "Positive," "Negative," and "No Data." In some embodiments where the "Positive" disease score has more than one level (e.g., the disease score uses a 1-10 scale), the "Positive" disease score type may have various pattern densities, various colored point densities, or various colored overlay intensities (i.e., levels of darkness or color depths), that indicate the disease score level.

In some embodiments, the disease score values update regularly (e.g., changing daily based on the detection of pathogens). In one embodiment, the disease score values update each time a new pathogen incidence indicator level or a new ambient weather parameter is received by the user device, or is saved to a server connected to the user device. In one embodiment, the latest disease score values are sent to the user device at a frequency selected by the user. In some embodiments, the disease score values are overlaid on a map received by the user device from a commercial map provider (e.g., Google Maps).

Figure 14:
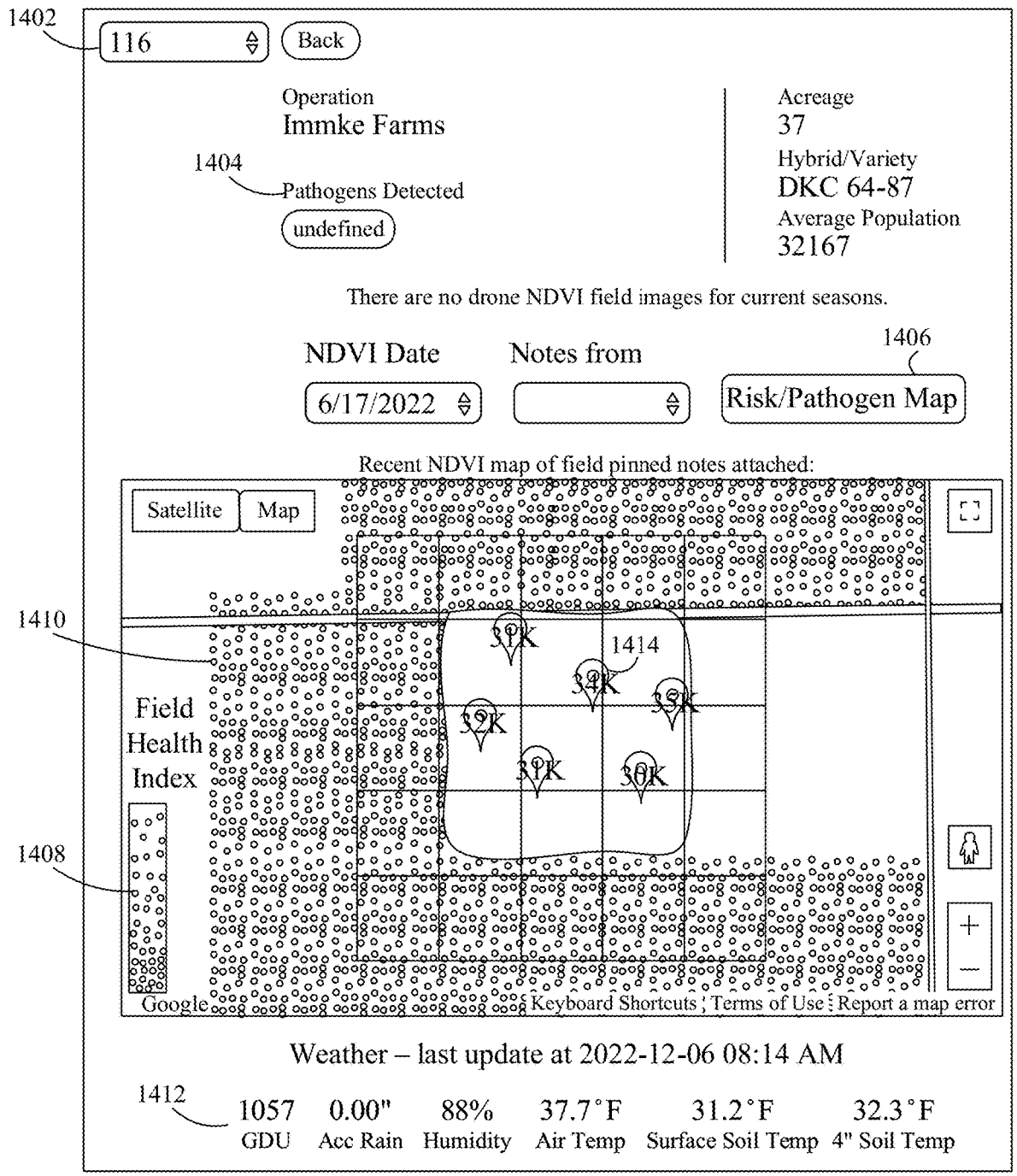
FIG. 14 illustrates a summary of a field report, in accordance with an exemplary embodiment of the present invention.

The disease heatmap representations of FIGS. 12 and 13 enable a superior representation of the area that is under pathogen pressure. In one embodiment, if a pre-determined disease risk indicator threshold is exceeded and a pathogen is detected within a threshold distance of a target field, then a field report is automatically generated and populated in an application installed on the user device (e.g., Agtrinsic). In another embodiment, if a pre-determined disease score is exceeded, then a field report is automatically generated and populated in an application installed on the user device. In both embodiments, an alert (e.g., a text alert) may be generated and sent to the user device, informing the user that a report is to be reviewed. FIG. 14 illustrates a summary of a field report, in accordance with an exemplary embodiment of the present invention, and FIG. 15 illustrates additional details of a field report, in accordance with an exemplary embodiment of the present invention.

FIG. 14 shows an embodiment of a field report summary where the field name or number ("116" in FIG. 14) may be selected by the user using a drop-down menu (1402). The field report may include a list of detected pathogens (e.g., under a "pathogens detected" field (1404)) and a listing of recent or current ambient weather parameters (1412). In addition, the field report may include one or more maps, such as a normalized difference vegetation index (NDVI) map, a disease risk indicator map, a pathogen heatmap, or a disease score map. A second drop-down menu (1406) controls which maps are represented on the display of the user device. The field report shown in FIG. 14 includes an NDVI map showing a field health index scale (1408) showing various health index intensities, as well as various population counts (1414). The NDVI data (i.e., health index data) are both overlaid on a commercial map service showing the geographical area of interest (i.e., Google Maps).

FIG. 15 shows an embodiment of a field report selection GUI allowing the user to search for a field by typing its name or number in a search field (1502). Each row (1504) of the search result screen represents a field, where the user may select a field by clicking on its row. In one embodiment, in the absence of a search, the user device displays the fields available in a database connected to the user device alphabetically. In another embodiment, the user device displays the fields around the user device's GPS location in order of proximity. In the embodiment of FIG. 15, each listed field has one or more color or pattern density indicators (1506) representing the crop emergence level (i.e., emerged plants as a percentage or fraction of the planted seeds) recorded on the field. Furthermore, various columns may be included in the field listing, including recent analytics and scouting dates.

Exemplary System Architecture

Figure 17:
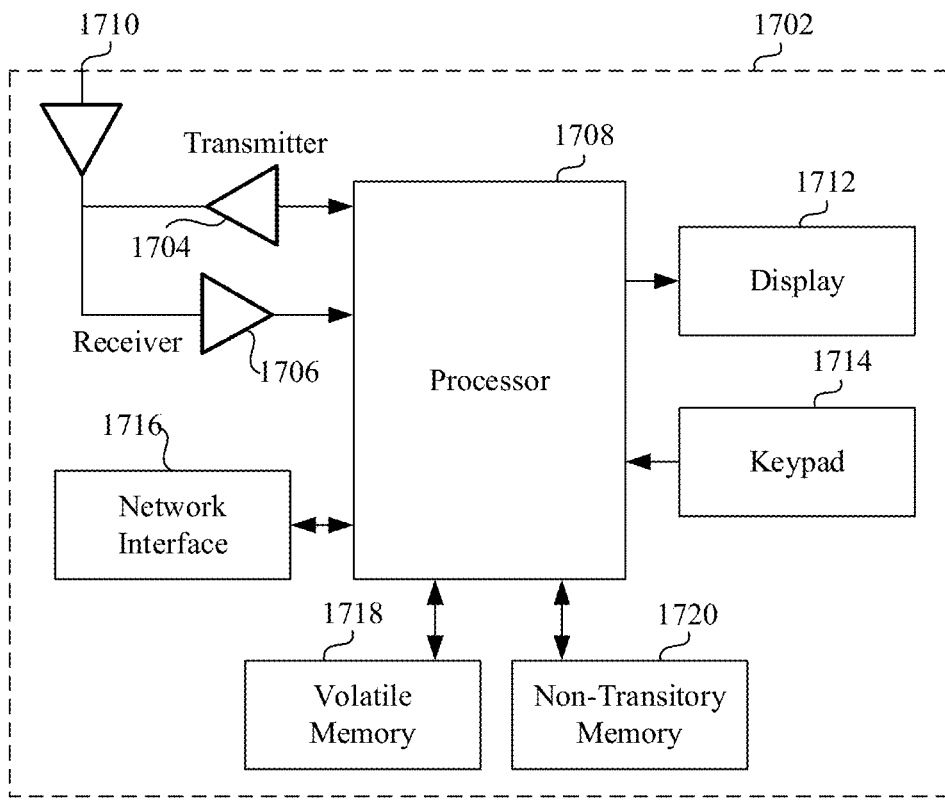
FIG. 17 provides an illustrative schematic representative of a client (user computing entity) that can be used for predicting crop disease, in conjunction with embodiments of the present invention.
Figure 18:
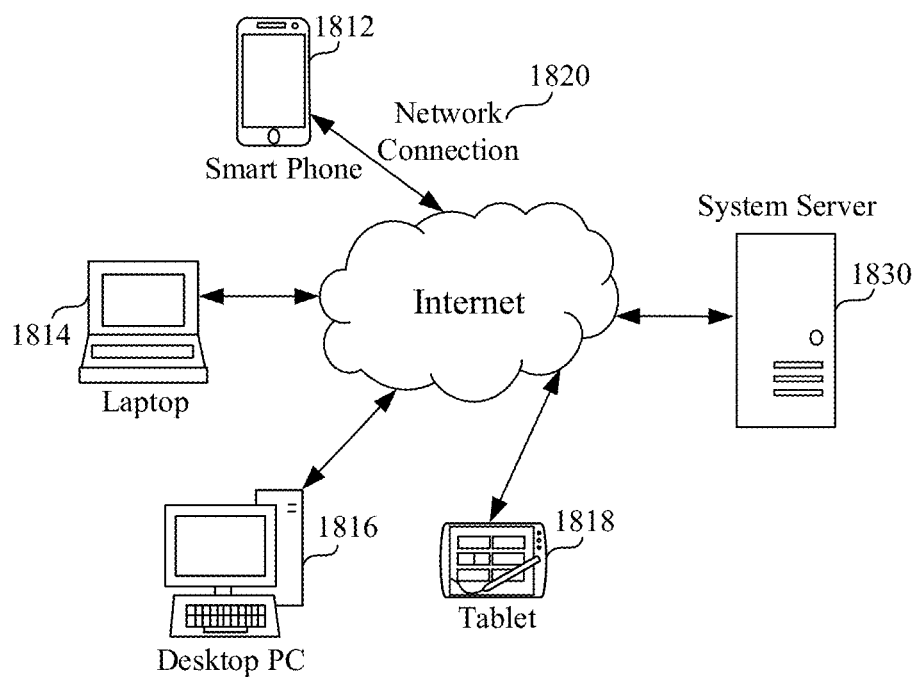
FIG. 18 shows an illustrative diagram of a client-server environment that can be used for predicting crop disease, according to one embodiment of the present invention.

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks. While FIGS. 16-18 illustrate the various system entities as separate, standalone entities, the various embodiments are not limited to this particular architecture.

Exemplary Management Computing Entity

Figure 16:
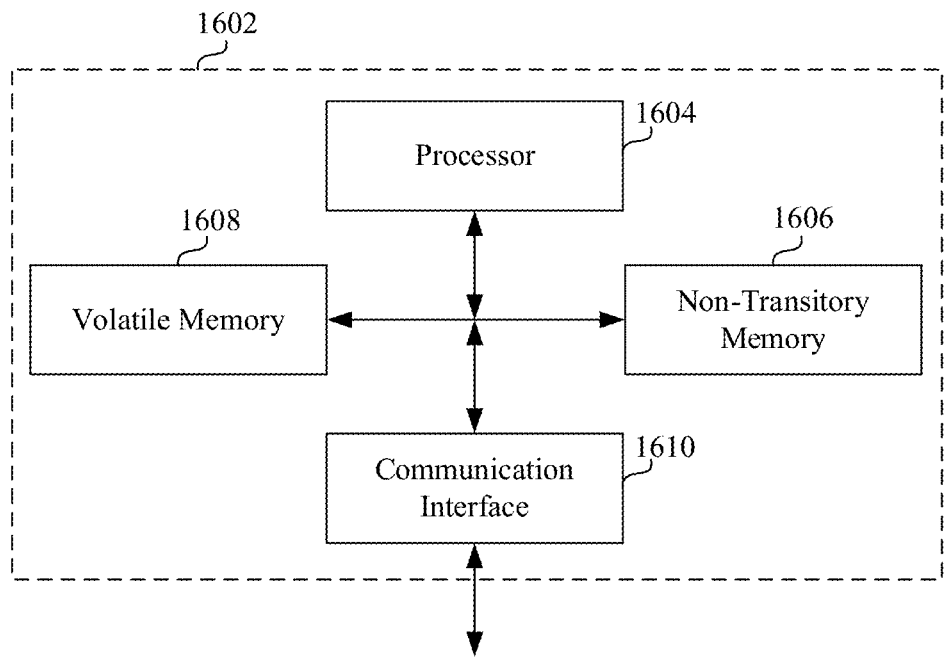
FIG. 16 provides a schematic of a server (management computing entity) that can be used for predicting crop disease, according to one embodiment of the present invention.

FIG. 16 provides a schematic of a schematic of a server (management computing entity 1602) according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (1602) may also include one or more communications interfaces (1610) for communicating with various computing entities, such as by communicating data, content, and/or information (similar terms used herein interchangeably) that can be transmitted, received, operated on, processed, displayed, stored, and/or the like.

As shown in FIG. 16, in one embodiment, the management computing entity (1602) may include or be in communication with one or more processors (i.e., processing elements, 1604, also referred to as processors and/or processing circuitry, and similar terms used herein interchangeably) that communicate with other elements within the management computing entity (1602) via a bus, for example. As will be understood, the processor (1604) may be embodied in a number of different ways. For example, the processor (1604) may be embodied as one or more complex programmable logic devices (CPLDs), microprocessors, multi-core processors, coprocessing entities, application-specific instruction-set processors (ASIPs), microcontrollers, and/or controllers. Further, the processor (1604) may be embodied as one or more other processing devices or circuitry. The term circuitry may refer to an entire hardware embodiment or a combination of hardware and computer program products. Thus, the processor (1604) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (1604) may be configured for a particular use or configured to execute instructions stored in volatile (1608) or non-volatile (or non-transitory 1606) media or otherwise accessible to the processor (1604). As such, whether configured by hardware or computer program products, or by a combination thereof, the processor (1604) may be capable of performing steps or operations according to embodiments of the present disclosure when configured accordingly.

In one embodiment, the management computing entity (1602) may further include or be in communication with non-transitory memory (1606) (also referred to as non-volatile media, non-volatile storage, non-transitory storage, memory, memory storage, and/or memory circuitry—similar terms used herein interchangeably). In one embodiment, the non-transitory memory or storage (1606) may include one or more non-transitory memory or storage media (1606), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage (1606) or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (1602) may further include or be in communication with volatile media (1608) (also referred to as volatile storage, memory, memory storage, memory and/or circuitry—similar terms used herein interchangeably). In one embodiment, the volatile storage or memory (1608) may also include one or more volatile storage or memory media 1608, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory (1608) media may be used to store at least portions of the databases, database instances, database management systems, data, applications, programs, program modules, scripts, source code, object code, byte code, compiled code, interpreted code, machine code, executable instructions, and/or the like being executed by, for example, the processor (1604). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (1602) with the assistance of the processor (1604) and operating system.

As indicated, in one embodiment, the management computing entity (1602) may also include one or more communications interfaces (1610) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (1602) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (1602) may include or be in communication with one or more input elements, such as a keyboard input, a mouse input, a touch screen/display input, motion input, movement input, audio input, pointing device input, joystick input, keypad input, and/or the like. The management computing entity (1602) may also include or be in communication with one or more output elements (not shown), such as audio output, video output, screen/display output, motion output, movement output, and/or the like.

As will be appreciated, one or more of the components of the management computing entity (1602) may be located remotely from other management computing entity (1602) components, such as in a distributed system. Furthermore, one or more of the components may be combined and additional components performing functions described herein may be included in the management computing entity (1602). Thus, the management computing entity (1602) can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 17 provides an illustrative schematic representative of a client (user computing entity, 1702) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (1702) can be operated by various parties. As shown in FIG. 17, the user computing entity (1702) can include an antenna (1710), a transmitter (1704) (e.g., radio), a receiver (1706) (e.g., radio), and a processor (i.e., processing element) (1708) (e.g., CPLDs, microprocessors, multi-core processors, coprocessing entities, ASIPs, microcontrollers, and/or controllers) that provides signals to and receives signals from the transmitter (1704) and receiver (1706), respectively.

The signals provided to and received from the transmitter (1704) and the receiver (1706), respectively, may include signaling information in accordance with air interface standards of applicable wireless systems. In this regard, the user computing entity (1702) may be capable of operating with one or more air interface standards, communication protocols, modulation types, and access types. More particularly, the user computing entity (1702) may operate in accordance with any of a number of wireless communication standards and protocols, such as those described above with regard to the management computing entity (1602). In a particular embodiment, the user computing entity (1702) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (1702) may operate in accordance with multiple wired communication standards and protocols, such as those described above with regard to the management computing entity (1602) via a network interface (1716).

Via these communication standards and protocols, the user computing entity (1702) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity (1702) can also download changes, add-ons, and updates, for instance, to its firmware, software (e.g., including executable instructions, applications, program modules), and operating system.

According to one embodiment, the user computing entity (1702) may include location determining aspects, devices, modules, functionalities, and/or similar words used herein interchangeably. For example, the user computing entity (1702) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's (1702) position in connection with a variety of other systems, including cellular towers, Wi-Fi access points, and/or the like. Similarly, the user computing entity (1702) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity (1702) may also comprise a user interface (that can include a display (1712) coupled to a processor (1708) and/or a user input interface coupled to a processor (1708). For example, the user interface may be a user application, browser, user interface, and/or similar words used herein interchangeably executing on and/or accessible via the user computing entity (1702) to interact with and/or cause display of information from the management computing entity (1602), as described herein. The user input interface can comprise any of a number of devices or interfaces allowing the user computing entity (1702) to receive data, such as a keypad (1714) (hard or soft), a touch display, voice/speech or motion interfaces, or other input device. In embodiments including a keypad (1714), the keypad (1714) can include (or cause display of) the conventional numeric (0-9) and related keys (#, *), and other keys used for operating the user computing entity (1702) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (1702) can also include volatile storage or memory (1718) and/or non-transitory storage or memory (1720), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (1702). As indicated, this may include a user application that is resident on the entity or accessible through a browser or other user interface for communicating with the management computing entity (1602) and/or various other computing entities.

In another embodiment, the user computing entity (1702) may include one or more components or functionality that are the same or similar to those of the management computing entity (1602), as described in greater detail above. As will be recognized, these architectures and descriptions are provided for exemplary purposes only and are not limiting to the various embodiments.

Exemplary Client Server Environment

The present invention may be implemented in a client server environment. FIG. 18 shows an illustrative system architecture for implementing one embodiment of the present invention in a client server environment. User devices (i.e., image-capturing device) (1810) on the client side may include smart phones (1812), laptops (1814), desktop PCs (1816), tablets (1818), or other devices. Such user devices (1810) access the service of the system server (1830) through some network connection (1820), such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop (1816), laptop (1814), mobile device (1812), and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer including a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the type of machine or computer-readable media used to affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMs), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" in various places throughout this specification are not necessarily all referring to the same embodiment.

What is claimed is:

1. A non-transitory physical storage medium storing program code, the program code when executed by a hardware processor executes a process for predicting an airborne disease related to a crop field of a crop and neighboring crop fields, the program code comprising steps to:
   receive a sample historical weather data set from a weather information service;
   receive a sample known disease risk indicator set associated with the airborne disease, wherein at least one sample known disease risk indicator set originates from ground-truth severity measures of the airborne disease through measurements of canopy conditions;
   cross-validate the sample historical weather data set by applying leave-one-out cross-validation on a plurality of crop fields observed in the at least one sample historical weather data set (leave-one-field-out);
   execute neural network training of a disease risk machine learning module on ground truth data comprising the cross-validated sample historical weather data sets from the weather information database and the one or more sample known disease risk indicator sets associated with the airborne disease, wherein the disease risk machine learning module is a bidirectional long short-term memory (LSTM) neural network;
   receive an ambient weather parameter related to environmental conditions within or surrounding the crop field from an environmental sensor;
   execute the disease risk machine learning module to determine a predicted disease risk indicator associated with the airborne disease and the crop field based on the ambient weather parameter;
   measure a pathogen incidence indicator related to a presence of a pathogen within or surrounding the crop field using a spore collection device located within a distance threshold to the crop field, wherein the pathogen is associated with the airborne disease, and wherein the spore collection device is a hardware device that detects the number of pathogen spore particles per unit volume;
   generate a disease score based on combining the predicted disease risk indicator and the pathogen incidence indicator, wherein the disease score represents a predicted severity of the airborne disease within the crop field; and
   generate a disease heat map for the airborne disease over the crop field and the neighboring crop fields, wherein the disease heat map is generated from the disease score over the crop field and disease scores over the neighboring crop fields.

2. The non-transitory physical storage medium of claim 1, wherein the disease score at a given crop field location is proportional to the disease risk indicator at the given crop field location, when a pathogen is detected within a pre-defined distance threshold of the given crop field location.

3. The non-transitory physical storage medium of claim 1, wherein the program code further comprises a step to validate the one or more ambient weather parameters related to ambient environmental conditions using stratified random sampling.

4. The non-transitory physical storage medium of claim 1, wherein the historical weather data is based on a pre-defined time window determined based on a combination of the crop and the pathogen.

5. The non-transitory physical storage medium of claim 1, wherein at least one ambient weather parameter is selected from the group consisting of temperature, heat index, atmospheric pressure, humidity, wind speed, and cloudiness around the crop field.

* * * * *